United States Patent
Zhao et al.

(10) Patent No.: US 9,485,713 B2
(45) Date of Patent: Nov. 1, 2016

(54) CIRCUIT, METHOD, AND RELATED APPARATUS FOR AVOIDING CHANNEL INTERFERENCE

(71) Applicant: Huawei Device Co., Ltd., Shenzhen (CN)

(72) Inventors: Yu Zhao, Shenzhen (CN); Chonglu Chen, Xi'an (CN); Dong Chen, Xi'an (CN); Xiaofeng Zhang, Xi'an (CN); Chao Xiang, Xi'an (CN); Xiaoyu Wen, Xi'an (CN)

(73) Assignee: Huawei Device Co., Ltd., Shenzhen (CN)

( * ) Notice: Subject to any disclaimer, the term of this patent is extended or adjusted under 35 U.S.C. 154(b) by 0 days.

(21) Appl. No.: 14/954,126

(22) Filed: Nov. 30, 2015

(65) Prior Publication Data

US 2016/0088548 A1    Mar. 24, 2016

Related U.S. Application Data

(63) Continuation of application No. PCT/CN2014/085772, filed on Sep. 2, 2014.

(30) Foreign Application Priority Data

Sep. 18, 2013  (CN) .......................... 2013 1 0431695

(51) Int. Cl.
*H04W 88/08*    (2009.01)
*H04W 48/06*    (2009.01)
(Continued)

(52) U.S. Cl.
CPC ............. *H04W 48/06* (2013.01); *H04W 24/02* (2013.01); *H04W 48/18* (2013.01); *H04B 17/345* (2015.01); *H04W 84/04* (2013.01); *H04W 84/12* (2013.01); *H04W 88/06* (2013.01)

(58) Field of Classification Search
CPC ... H04W 24/02; H04W 48/18; H04W 48/06; H04W 84/12; H04W 84/04; H04W 88/08; H04W 88/00; H04W 88/06; H04W 88/10; H04W 48/00; H04W 48/02; H04W 48/16; H04W 48/20; H04W 40/12; H04W 40/16; H04B 17/345
See application file for complete search history.

(56) References Cited

U.S. PATENT DOCUMENTS 8,331,289 B1    12/2012 Lee et al.
9,130,605 B2 *   9/2015 Hsu .................. H04B 1/006
(Continued)

FOREIGN PATENT DOCUMENTS

CN    101478354 A    7/2009
CN    201682489 U   12/2010
(Continued)

OTHER PUBLICATIONS

Partial English Translation and Abstract of Chinese Patent Application No. CN101478354, Mar. 12, 2016, 14 pages.
(Continued)

*Primary Examiner* — Meless Zewdu
(74) *Attorney, Agent, or Firm* — Conley Rose, P.C.; Grant Rodolph

(57) ABSTRACT

A circuit for avoiding channel interference, including a Wireless Fidelity (Wi-Fi) chip and at least one first single-pole multi-throw switch, where a movable end of the first single-pole multi-throw switch is connected to a signal transmit pin of the Wi-Fi chip; one non-movable end of the first single-pole multi-throw switch is connected to a first signal transmit tributary while another is connected to a second signal transmit tributary; and when the Wi-Fi chip determines that a first channel and a second channel interfere with each other, the movable end of the first single-pole multi-throw switch is controlled to connect to the second non-movable end of the first single-pole multi-throw switch, where the first channel is a wireless local area network channel, and the second channel is different from the wireless local area network channel.

19 Claims, 15 Drawing Sheets

(51) Int. Cl.
  *H04W 24/02* (2009.01)
  *H04W 48/18* (2009.01)
  H04B 17/345 (2015.01)
  H04W 84/04 (2009.01)
  H04W 84/12 (2009.01)
  H04W 88/06 (2009.01)

(56) References Cited

U.S. PATENT DOCUMENTS

| | | | |
|---|---|---|---|
| 2002/0008672 A1* | 1/2002 | Gothard | H01Q 1/246 343/893 |
| 2010/0316027 A1 | 12/2010 | Rick et al. | |
| 2011/0007675 A1* | 1/2011 | Chiou | H04B 1/406 370/297 |
| 2014/0269650 A1* | 9/2014 | Sahota | H04W 84/12 370/338 |

FOREIGN PATENT DOCUMENTS

| | | |
|---|---|---|
| CN | 101951283 A | 1/2011 |
| CN | 102461327 A | 5/2012 |

OTHER PUBLICATIONS

Foreign Communication From a Counterpart Application, PCT Application No. PCT/CN2014/085772, English Translation of International Search Report dated Dec. 8, 2014, 2 pages.

Foreign Communication From a Counterpart Application, PCT Application No. PCT/CN2014/085772, English Translation of Written Opinion dated Dec. 8, 2014, 14 pages.

Foreign Communication From a Counterpart Application, European Application No. 14845511.6, Extended European Search Report dated Jun. 23, 2016, 7 pages.

* cited by examiner

CIRCUIT, METHOD, AND RELATED APPARATUS FOR AVOIDING CHANNEL INTERFERENCE

CROSS-REFERENCE TO RELATED APPLICATIONS

This application is a continuation of International Application No. PCT/CN2014/085772, filed on Sep. 2, 2014, which claims priority to Chinese Patent Application No. 201310431695.4, filed on Sep. 18, 2013, both of which are hereby incorporated by reference in their entireties.

TECHNICAL FIELD

The present disclosure relates to the field of communications technologies, and in particular, to a circuit, method, and related apparatus for avoiding channel interference.

BACKGROUND

As communications standards and signal frequency bands currently supported by a terminal are increasing, the terminal becomes more easily exposed to a problem that signals of different communications standards that are received and transmitted by the terminal coexist and interfere with each other. By using a wireless local area network (e.g., Wireless Fidelity (Wi-Fi)) and a Long Term Evolution (LTE) system as an example, because application frequency bands of the LTE system are various, where a quantity of frequency bands that are relatively close to a frequency band of Wi-Fi is relatively large, a currently common typical scenario of coexistence of signals of different communications standards is that a Wi-Fi signal coexists with an LTE system signal.

FIG. 1 is a schematic diagram of a scenario in which a Wi-Fi signal coexists with an LTE system signal. A mobile wireless local area network (Mobile Wi-Fi) terminal shown in FIG. 1 may be handed over between a Worldwide Interoperability for Microwave Access (WiMAX) system, an LTE system, and 2.4G Wi-Fi so as to provide data experience of wide coverage and high performance for a user on a downlink local area network (LAN) side. More specifically, an uplink wide area network (WAN) side of the Mobile Wi-Fi terminal may be a WiMAX system, an LTE system, or Wi-Fi, such that in an uplink direction, the Mobile Wi-Fi terminal may be connected to the Internet using the WiMAX system, the LTE system, the Wi-Fi, or the like. However, in a downlink direction, universal serial bus (USB) and Wi-Fi access may be provided, such that a device (for example, a mobile phone or a portable computer) that has a function of a Wi-Fi client (that is, Wi-Fi station (STA)) or a function of a USB interface may be connected to the Mobile Wi-Fi terminal using a Wi-Fi client installed on the device, so as to further implement indirect access to the Internet using the Mobile Wi-Fi terminal.

Currently, after entering an area covered by Wi-Fi, the Mobile Wi-Fi terminal can be automatically switched to accessing the Wi-Fi using a Wi-Fi hotspot (for example, a wireless access hotspot (Access Point (AP)), and access the Internet by means of Wi-Fi. However, after the Mobile Wi-Fi terminal leaves the area covered by the Wi-Fi, when there is no Wi-Fi hotspot nearby, the Mobile Wi-Fi terminal is switched again to accessing the Internet using the WiMAX system or the LTE system. By using this technology referred to as an offloading technology, coordination of multiple network resources in a unified manner may be implemented. For example, when the WiMAX system and the LTE system are congested, the technology may be used to implement offloading of some users to Wi-Fi.

When the foregoing offloading technology is implemented in an actual application, some channels of 2.4G Wi-Fi generate interference to a WiMAX system (or LTE system) channel; therefore, when the Mobile Wi-Fi terminal is handed over from the 2.4G Wi-Fi to the WiMAX (or LTE) system, because a 2.4G Wi-Fi signal transmitted by the Mobile Wi-Fi terminal interferes with a WiMAX (or LTE) system signal, a handover failure may be caused.

In addition, in the prior art, there is still a problem that a Wi-Fi channel on the downlink LAN side of the Mobile Wi-Fi terminal interferes with a WiMAX (or LTE) system channel on the uplink WAN side of the Mobile Wi-Fi terminal.

SUMMARY

Embodiments of the present disclosure provide a circuit, method, and related apparatus for avoiding channel interference, so as to resolve a problem in the prior art that, when a Mobile Wi-Fi terminal is handed over between 2.4G Wi-Fi and a WiMAX (or LTE) system, a handover failure may occur, and a WiMAX (or LTE) system channel on an uplink WAN side and a Wi-Fi channel on a downlink LAN side interfere with each other.

According to a first aspect of the present disclosure, a circuit for avoiding channel interference is provided, including a Wi-Fi chip, where the circuit further includes at least one first single-pole multi-throw switch, where a movable end of the first single-pole multi-throw switch is connected to a signal transmit pin of the Wi-Fi chip; and the first single-pole multi-throw switch includes at least two non-movable ends, a first non-movable end of the at least two non-movable ends is connected to a first signal transmit tributary, and a second non-movable end of the at least two non-movable ends is connected to a second signal transmit tributary; the second signal transmit tributary includes a power attenuator, and an input end of the power attenuator is connected to the second non-movable end of the first single-pole multi-throw switch; and when the Wi-Fi chip determines that a first channel and a second channel interfere with each other, the movable end of the first single-pole multi-throw switch is controlled to connect to the second non-movable end of the first single-pole multi-throw switch, where the first channel is a wireless local area network channel, and the second channel is different from the wireless local area network channel.

With reference to a possible implementation manner of the first aspect in the present disclosure, in a first possible implementation manner, the circuit further includes a second single-pole multi-throw switch, and a band-pass filter and a radio-frequency signal transceiver antenna that are sequentially connected in series to a movable end of the second single-pole multi-throw switch, where a first non-movable end of the second single-pole multi-throw switch is connected to the first non-movable end of the first single-pole multi-throw switch; an output end of the power attenuator is connected to the first non-movable end of the second single-pole multi-throw switch; and a second non-movable end of the second single-pole multi-throw switch is connected to a signal receive pin of the Wi-Fi chip using the band-pass filter, where the second single-pole multi-throw switch connects, under control of a connection control signal transmitted by the Wi-Fi chip, the movable end of the second single-pole multi-throw switch and the first non-movable end of the second single-pole multi-throw switch, or the movable end of the second single-pole multi-throw switch and the second non-movable end of the second single-pole multi-throw switch.

In the first possible implementation manner of the first aspect of the present disclosure, in a second possible implementation manner, that a first non-movable end of the second single-pole multi-throw switch is connected to the first non-movable end of the first single-pole multi-throw switch includes that the first non-movable end of the second single-pole multi-throw switch is connected to a movable end of a third single-pole multi-throw switch; and a first non-movable end of the third single-pole multi-throw switch is connected to the first non-movable end of the first single-pole multi-throw switch; and that an output end of the power attenuator is connected to the first non-movable end of the second single-pole multi-throw switch includes that the output end of the power attenuator is connected to a second non-movable end of the third single-pole multi-throw switch; and the movable end of the third single-pole multi-throw switch is connected to the first non-movable end of the second single-pole multi-throw switch, where the third single-pole multi-throw switch connects, under control of a connection control signal transmitted by the Wi-Fi chip, the movable end of the third single-pole multi-throw switch and the first non-movable end of the third single-pole multi-throw switch, or the movable end of the third single-pole multi-throw switch and the second non-movable end of the third single-pole multi-throw switch.

In the second possible implementation manner of the first aspect of the present disclosure, in a third possible implementation manner, the second single-pole multi-throw switch is a single-pole triple-throw switch.

In a possible implementation manner of the first aspect of the present disclosure, or in the first possible implementation manner of the first aspect of the present disclosure, in a fourth possible implementation manner, the first single-pole multi-throw switch and the power attenuator are included in a two-level adjustable attenuator.

According to a second aspect of the present disclosure, a method for avoiding channel interference is provided, including determining, by an AP, whether a Wi-Fi signal transmitted by a signal transmit pin of a Wi-Fi chip disposed in a Mobile Wi-Fi terminal generates interference to a signal of a communications standard different from a Wi-Fi communications standard; when a result of the determining is yes, after a movable end of a first single-pole multi-throw switch that is connected to the signal transmit pin and a second non-movable end of the first single-pole multi-throw switch are controlled, transmitting, by the AP, the Wi-Fi signal using the signal transmit pin, where the movable end of the first single-pole multi-throw switch is connected to the signal transmit pin; the first single-pole multi-throw switch includes at least two non-movable ends, a first non-movable end of the at least two non-movable ends is connected to a first signal transmit tributary, and the second non-movable end of the at least two non-movable ends is connected to a second signal transmit tributary; and the second signal transmit tributary includes a power attenuator, and an input end of the power attenuator is connected to the second non-movable end of the first single-pole multi-throw switch.

According to a third aspect of the present disclosure, a method for avoiding channel interference is provided, including determining, by a Mobile Wi-Fi terminal in which a Wi-Fi chip is disposed, whether a first Wi-Fi signal transmitted using a signal transmit pin of the Wi-Fi chip generates interference to a signal of a communications standard different from a Wi-Fi communications standard; when a result of the determining is yes, after a movable end of a first single-pole multi-throw switch that is connected to the signal transmit pin and a second non-movable end of the first single-pole multi-throw switch are controlled, transmitting, by the Mobile Wi-Fi terminal, the first Wi-Fi signal using the signal transmit pin, where the movable end of the first single-pole multi-throw switch is connected to the signal transmit pin; the first single-pole multi-throw switch includes at least two non-movable ends, a first non-movable end of the at least two non-movable ends is connected to a first signal transmit tributary, and the second non-movable end of the at least two non-movable ends is connected to a second signal transmit tributary; and the second signal transmit tributary includes a power attenuator, and an input end of the power attenuator is connected to the second non-movable end of the first single-pole multi-throw switch.

In a possible implementation manner of the third aspect of the present disclosure, in a first possible implementation manner, after the transmitting, by the Mobile Wi-Fi terminal, the first Wi-Fi signal using the signal transmit pin, the method further includes determining, by the Mobile Wi-Fi terminal by scanning a frequency band that does not generate interference to a frequency band used by the signal of the communications standard different from the Wi-Fi communications standard and is used by a Wi-Fi signal that can be transmitted by the Wi-Fi chip, whether there is a second Wi-Fi signal that uses the frequency band that does not generate interference to the frequency band used by the signal of the communications standard different from the Wi-Fi communications standard; when a result of the determining is that there is the second Wi-Fi signal, and it is determined that a detected signal strength value of the second Wi-Fi signal is greater than a preset second signal strength threshold, after the first single-pole multi-throw switch is controlled to enable the movable end of the first single-pole multi-throw switch not connect to the first non-movable end or the second non-movable end of the first single-pole multi-throw switch, requesting, by the Mobile Wi-Fi terminal, to access an AP corresponding to the second Wi-Fi signal; and after the AP corresponding to the second Wi-Fi signal is successfully accessed, disconnecting, by the Mobile Wi-Fi terminal, the Mobile Wi-Fi terminal from another network that is on the WAN side and different from Wi-Fi to which the second Wi-Fi signal belongs.

In the first possible implementation manner of the third aspect of the present disclosure, in a second possible implementation manner, the method further includes, when an AP corresponding to the first Wi-Fi signal is not successfully accessed, after the movable end of the first single-pole multi-throw switch is controlled to connect to the second non-movable end of the first single-pole multi-throw switch, transmitting, by the Mobile Wi-Fi terminal, the first Wi-Fi signal using the signal transmit pin.

In the second possible implementation manner of the third aspect of the present disclosure, in a third possible implementation manner, the method further includes, when the result of the determining is that there is no such second Wi-Fi signal, determining, by the Mobile Wi-Fi terminal by scanning a frequency band that generates interference to the frequency band used by the signal of the communications standard different from the Wi-Fi communications standard and is used by a Wi-Fi signal that can be transmitted by the Wi-Fi chip, whether there is a third Wi-Fi signal in the frequency band that generates interference to the frequency band used by the signal of the communications standard different from the Wi-Fi communications standard, where Wi-Fi to which the third Wi-Fi signal belongs is different from Wi-Fi to which the first Wi-Fi signal belongs; when it is determined that there is the third Wi-Fi signal, determining, by the Mobile Wi-Fi terminal, whether a signal strength value of the third Wi-Fi signal meets a preset condition, where the preset condition includes a condition that enables the Mobile Wi-Fi terminal to be capable of accessing an AP corresponding to the third Wi-Fi signal, and enables a value of an extent to which the signal of the other communications standard interferes with the third Wi-Fi signal to be not greater than a preset interference extent threshold; when it is determined that the signal strength value of the third Wi-Fi signal meets the preset condition, after the movable end of the first single-pole multi-throw switch is controlled not to connect to the first non-movable end or the second non-movable end of the first single-pole multi-throw switch, requesting, by the Mobile Wi-Fi terminal, to access the AP corresponding to the third Wi-Fi signal; and after the AP corresponding to the third Wi-Fi signal is successfully accessed, disconnecting, by the Mobile Wi-Fi terminal, the Mobile Wi-Fi terminal from another network that is on the WAN side and different from the Wi-Fi to which the third Wi-Fi signal belongs.

In the third possible implementation manner of the third aspect of the present disclosure, in a fourth possible implementation manner, the method further includes, when the Wi-Fi to which the third Wi-Fi signal belongs is not successfully accessed, after the movable end of the first single-pole multi-throw switch is controlled to connect to the second non-movable end of the first single-pole multi-throw switch, transmitting, by the Mobile Wi-Fi terminal, the first Wi-Fi signal using the signal transmit pin.

In the third possible implementation manner of the third aspect of the present disclosure, in a fifth possible implementation manner, the determining, by the Mobile Wi-Fi terminal, whether a signal strength value of the third Wi-Fi signal meets a preset condition includes determining, by the Mobile Wi-Fi terminal, whether the signal strength value of the third Wi-Fi signal is greater than a preset third signal strength threshold, where the third signal strength threshold is a minimum signal strength value that enables the Mobile Wi-Fi terminal to be capable of accessing the Wi-Fi to which the third Wi-Fi signal belongs; and when it is determined that the signal strength value of the third Wi-Fi signal is greater than the third signal strength threshold, determining, by the Mobile Wi-Fi terminal, whether the signal strength value of the third Wi-Fi signal is greater than a preset fourth signal strength threshold, where the fourth signal strength threshold is a minimum signal strength value, which enables the value of the extent to which the signal of the other communications standard interferes with the third Wi-Fi signal to be not greater than the preset interference extent threshold, of the third Wi-Fi signal.

According to a fourth aspect of the present disclosure, an apparatus for avoiding channel interference includes a determining unit configured to determine whether a Wi-Fi signal transmitted by a signal transmit pin of a Wi-Fi chip disposed in a Mobile Wi-Fi terminal generates interference to a signal of a communications standard different from a Wi-Fi communications standard; a control unit configured to, when a result of the determining that is obtained by the determining unit is yes, control a movable end of a first single-pole multi-throw switch that is connected to the signal transmit pin to connect to a second non-movable end of the first single-pole multi-throw switch; and a transmitting unit configured to, after the control unit controls the movable end of the first single-pole multi-throw switch that is connected to the signal transmit pin to connect to the second non-movable end of the first single-pole multi-throw switch, transmit the Wi-Fi signal using the signal transmit pin, where the movable end of the first single-pole multi-throw switch is connected to the signal transmit pin; the first single-pole multi-throw switch includes at least two non-movable ends, a first non-movable end of the at least two non-movable ends is connected to a first signal transmit tributary, and the second non-movable end of the at least two non-movable ends is connected to a second signal transmit tributary; and the second signal transmit tributary includes a power attenuator, and an input end of the power attenuator is connected to the second non-movable end of the first single-pole multi-throw switch.

According to a fifth aspect of the present disclosure, an apparatus for avoiding channel interference is provided, where a Wi-Fi chip is disposed in the apparatus, and the apparatus includes a determining unit configured to determine whether a first Wi-Fi signal transmitted using a signal transmit pin of the Wi-Fi chip generates interference to a signal of a communications standard different from a Wi-Fi communications standard; a control unit configured to, when a result of the determining that is obtained by the determining unit is yes, control a movable end of a first single-pole multi-throw switch that is connected to the signal transmit pin to connect to a second non-movable end of the first single-pole multi-throw switch; and a transmitting unit configured to, after the control unit controls the movable end of the first single-pole multi-throw switch that is connected to the signal transmit pin to connect to the second non-movable end of the first single-pole multi-throw switch, transmit the first Wi-Fi signal using the signal transmit pin, where the movable end of the first single-pole multi-throw switch is connected to the signal transmit pin; the first single-pole multi-throw switch includes at least two non-movable ends, a first non-movable end of the at least two non-movable ends is connected to a first signal transmit tributary, and the second non-movable end of the at least two non-movable ends is connected to a second signal transmit tributary; and the second signal transmit tributary includes a power attenuator, and an input end of the power attenuator is connected to the second non-movable end of the first single-pole multi-throw switch.

In a possible implementation manner of the fifth aspect of the present disclosure, in a first possible implementation manner, the apparatus further includes a judging unit configured to, after the transmitting unit transmits the first Wi-Fi signal using the signal transmit pin, determine, by scanning a frequency band that does not generate interference to a frequency band used by the signal of the communications standard different from the Wi-Fi communications standard and is used by a Wi-Fi signal that can be transmitted by the Wi-Fi chip, whether there is a second Wi-Fi signal that uses the frequency band that does not generate interference to the frequency band used by the signal of the communications standard different from the Wi-Fi communications standard; an accessing unit configured to, when a result of the determining that is obtained by the judging unit is that there is the second Wi-Fi signal, and it is determined that a detected signal strength value of the second Wi-Fi signal is greater than a preset second signal strength threshold, after the first single-pole multi-throw switch is controlled to enable the movable end of the first single-pole multi-throw switch not connect to the first non-movable end or the second non-movable end of the first single-pole multi-throw switch, request to access an AP corresponding to the second Wi-Fi signal; and a disconnecting unit configured to, after the apparatus successfully accesses the AP corresponding to the second Wi-Fi signal, disconnect the apparatus from another network that is on the WAN side and different from Wi-Fi to which the second Wi-Fi signal belongs.

In the first possible implementation manner of the fifth aspect of the present disclosure, in a second possible implementation manner, the control unit is further configured to, when the apparatus does not successfully access an AP corresponding to the first Wi-Fi signal, control the movable end of the first single-pole multi-throw switch to connect to the second non-movable end of the first single-pole multi-throw switch; and the transmitting unit is further configured to, after the movable end of the first single-pole multi-throw switch is connected to the second non-movable end of the first single-pole multi-throw switch, transmit the first Wi-Fi signal using the signal transmit pin.

In the first possible implementation manner of the fifth aspect of the present disclosure, in a third possible implementation manner, the judging unit is further configured to, when the result of the determining is that there is no such second Wi-Fi signal, determine, by scanning a frequency band that generates interference to the frequency band used by the signal of the communications standard different from the Wi-Fi communications standard and is used by a Wi-Fi signal that can be transmitted by the Wi-Fi chip, whether there is a third Wi-Fi signal in the frequency band that generates interference to the frequency band used by the signal of the communications standard different from the Wi-Fi communications standard, where Wi-Fi to which the third Wi-Fi signal belongs is different from Wi-Fi to which the first Wi-Fi signal belongs; and when it is determined that there is the third Wi-Fi signal, determine whether a signal strength value of the third Wi-Fi signal meets a preset condition, where the preset condition includes a condition that enables the apparatus to be capable of accessing an AP corresponding to the third Wi-Fi signal, and enables a value of an extent to which the signal of the other communications standard interferes with the third Wi-Fi signal to be not greater than a preset interference extent threshold; the accessing unit is further configured to, when it is determined that the signal strength value of the third Wi-Fi signal meets the preset condition, after the movable end of the first single-pole multi-throw switch is controlled not to connect to the first non-movable end or the second non-movable end of the first single-pole multi-throw switch, request to access the AP corresponding to the third Wi-Fi signal; and the disconnecting unit is further configured to, after the apparatus successfully accesses the AP corresponding to the third Wi-Fi signal, disconnect the apparatus from another network that is on the WAN side and different from the Wi-Fi to which the third Wi-Fi signal belongs.

In the third possible implementation manner of the fifth aspect of the present disclosure, in a fourth possible implementation manner, the control unit is further configured to, when the apparatus does not successfully access the Wi-Fi to which the third Wi-Fi signal belongs, control the movable end of the first single-pole multi-throw switch to connect to the second non-movable end of the first single-pole multi-throw switch; and the transmitting unit is further configured to, after the movable end of the first single-pole multi-throw switch is connected to the second non-movable end of the first single-pole multi-throw switch, transmit the first Wi-Fi signal using the signal transmit pin.

In the third possible implementation manner of the fifth aspect of the present disclosure, in a fifth possible implementation manner, the judging unit is configured to determine whether the signal strength value of the third Wi-Fi signal is greater than a preset third signal strength threshold, where the third signal strength threshold is a minimum signal strength value that enables the apparatus to be capable of accessing the Wi-Fi to which the third Wi-Fi signal belongs; and when it is determined that the signal strength value of the third Wi-Fi signal is greater than the third signal strength threshold, determine whether the signal strength value of the third Wi-Fi signal is greater than a preset fourth signal strength threshold, where the fourth signal strength threshold is a minimum signal strength value, which enables the value of the extent to which the signal of the other communications standard interferes with the third Wi-Fi signal to be not greater than the preset interference extent threshold, of the third Wi-Fi signal.

Beneficial effects of the embodiments of the present disclosure are as follows.

By using the solutions provided in the embodiments of the present disclosure, it may be implemented that, a first single-pole multi-throw switch connects, under control of a Wi-Fi chip, a movable end and a second non-movable end of the first single-pole multi-throw switch, such that power of a Wi-Fi signal transmitted by a signal transmit pin connected to the first single-pole multi-throw switch is attenuated, thereby reducing interference of the Wi-Fi signal to a signal of another communications standard that is received by a device in which the Wi-Fi chip is disposed, avoiding a problem in the prior art that, because a 2.4G Wi-Fi signal transmitted by a Mobile Wi-Fi terminal interferes with a WiMAX (or LTE) system signal, a handover failure occurs when the Mobile Wi-Fi terminal is handed over between 2.4G Wi-Fi and a WiMAX (or LTE) system, and reducing mutual interference between a WiMAX (or LTE) system channel on an uplink WAN side of the Mobile Wi-Fi terminal and a Wi-Fi channel on a downlink LAN side.

DESCRIPTION OF EMBODIMENTS

To resolve a problem in the prior art that, because a 2.4G Wi-Fi signal transmitted by a Mobile Wi-Fi terminal interferes with a WiMAX (or LTE) system signal, a handover failure occurs when the Mobile Wi-Fi terminal is handed over between 2.4G Wi-Fi and a WiMAX (or LTE) system, and a problem in the prior art that a WiMAX (or LTE) system channel on an uplink WAN side of the Mobile Wi-Fi terminal and a Wi-Fi channel on a downlink LAN side of the Mobile Wi-Fi terminal interfere with each other. Embodiments of the present disclosure provide a solution to avoiding channel interference.

In this solution, a frequency band that generates interference to a signal (for example, a WiMAX or LTE system signal) of another communications standard and is used by a Wi-Fi signal transmitted by a Mobile Wi-Fi terminal is distinguished from a frequency band that does not generate interference to the signal of the other communications standard, such that when a frequency band used by a Wi-Fi signal to be transmitted by the Mobile Wi-Fi terminal is the frequency band that generates interference to the signal of the other communications standard and there is, on an uplink WAN side of the Mobile Wi-Fi terminal, a signal that is of the other communications standard and whose value of signal strength is greater than a preset signal strength threshold, the Wi-Fi signal is transmitted after transmit power of the Wi-Fi signal is reduced, thereby reducing interference generated by the Wi-Fi signal to a signal of another communications standard that is received by the Mobile Wi-Fi terminal, avoiding a problem that a handover failure occurs when the Mobile Wi-Fi terminal is handed over between 2.4G Wi-Fi and a WiMAX (or LTE) system, and avoiding a problem that a WiMAX (or LTE) system channel on the uplink WAN side of the Mobile Wi-Fi terminal and a Wi-Fi channel on a downlink LAN side interfere with each other.

The embodiments of the present disclosure are described below with reference to the accompanying drawings. It should be understood that the embodiments described herein are merely used for illustrating and explaining the present disclosure, but are not intended to limit the present disclosure. And in a non-conflict condition, the embodiments of the specification and features in the embodiments can be mutually combined.

Figure 1:
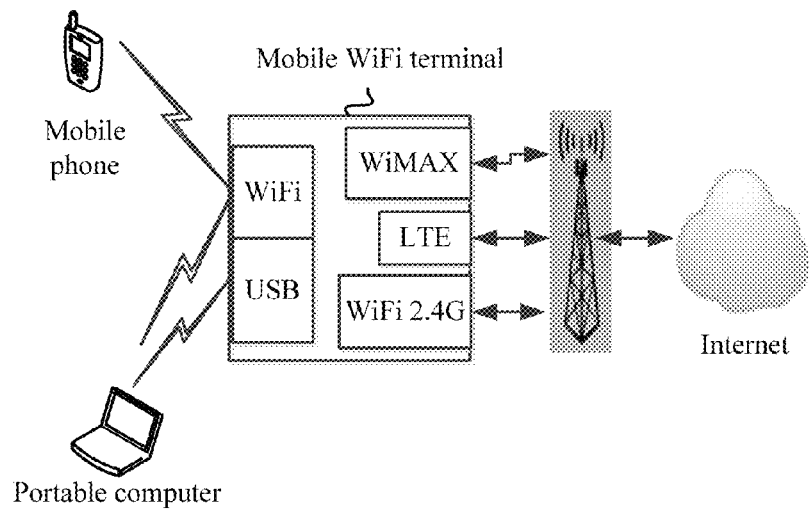
FIG. 1 is a schematic diagram of a scenario in which a Wi-Fi signal coexists with an LTE system signal.
Figure 2:
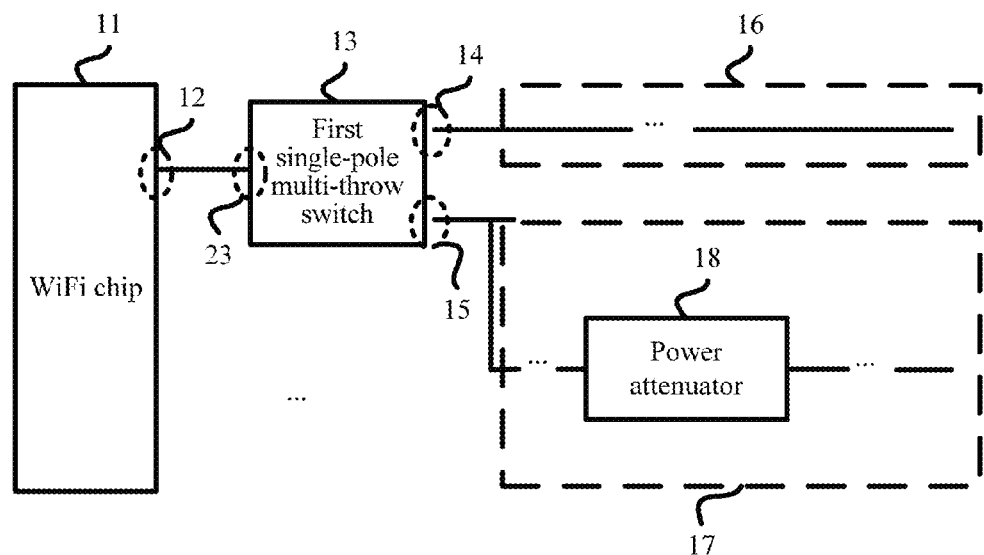
FIG. 2 is a schematic diagram of a structure of a circuit for avoiding channel interference according to an embodiment of the present disclosure.

First, an embodiment of the present disclosure provides a circuit for avoiding channel interference. A schematic diagram of a structure of the circuit is shown in FIG. 2. In addition to including a Wi-Fi chip 11, the circuit further includes at least one first single-pole multi-throw switch 13 connected to a signal transmit pin 12 of the Wi-Fi chip 11. In at least two different non-movable ends included in the first single-pole multi-throw switch 13, there are at least a first non-movable end 14 and a second non-movable end 15 that meet the following: The first non-movable end 14 is connected to a first signal transmit tributary 16, and the second non-movable end 15 is connected to a second signal transmit tributary 17. The first signal transmit tributary 16 does not include a power attenuator 18; the second signal transmit tributary 17 includes the power attenuator 18, and an input end of the power attenuator 18 is connected to the second non-movable end 15 of the first single-pole multi-throw switch 13.

A tributary in an area surrounded by an upper dashed-line block in FIG. 2 is the first signal transmit tributary 16, where " . . . " indicates some devices that may be included in the tributary. For description of devices that may be included in the first signal transmit tributary 16, refer to the subsequent description, and details are not described herein again. A tributary in an area surrounded by a lower dashed-line block in FIG. 2 is the second signal transmit tributary 17, where " . . . " indicates some devices that may be included in the tributary. For description of devices that may be included in the second signal transmit tributary 17, refer to the subsequent description, and details are not described herein again.

Based on the structure of the circuit shown in FIG. 2, the first single-pole multi-throw switch 13 may connect, under control of a connection control signal transmitted by the Wi-Fi chip 11 connected to the first single-pole multi-throw switch 13, a movable end 23 of the first single-pole multi-throw switch 13 and the first non-movable end 14 of the first single-pole multi-throw switch 13, or a movable end 23 of the first single-pole multi-throw switch 13 and the second non-movable end 15 of the first single-pole multi-throw switch 13. For example, the first single-pole multi-throw switch 13 may connect the movable end 23 of the first single-pole multi-throw switch 13 and the first non-movable end 14 of the first single-pole multi-throw switch 13 when receiving a first connection control signal; or may connect the movable end 23 of the first single-pole multi-throw switch 13 and the second non-movable end 15 of the first single-pole multi-throw switch 13 when receiving a second connection control signal. When the movable end 23 of the first single-pole multi-throw switch 13 is connected to the second non-movable end 15 of the first single-pole multi-throw switch 13, the power attenuator 18 in the second signal transmit tributary 17 according to this embodiment of the present disclosure is in a working state.

In this embodiment of the present disclosure, time for sending the second connection control signal may be time when it is determined that a first channel and a second channel interfere with each other. The first channel is a wireless local area network channel, and the second channel is different from the wireless local area network channel. For example, time for sending the second connection control signal may be time after it is determined that there is, on an uplink WAN side of a Mobile Wi-Fi terminal in which the Wi-Fi chip 11 shown in FIG. 2 is located, a signal that is of a communications standard different from a Wi-Fi communications standard and whose signal strength is greater than a preset signal strength threshold, and when a frequency band used by a Wi-Fi signal transmitted by the Wi-Fi chip 11 using the signal transmit pin 12 connected to the first single-pole multi-throw switch 13 generates interference to a frequency band used by the foregoing signal of the communications standard different from the Wi-Fi communications standard.

Whether the time for sending the second connection control signal is met currently may be determined by the Wi-Fi chip 11, or may be determined by an AP connected to the Mobile Wi-Fi terminal in which the Wi-Fi chip 11 is located. If it is determined by the Wi-Fi chip 11, the second connection control signal may be sent by the Wi-Fi chip 11; if it is determined by the AP, the second connection control signal may be sent by the AP.

After receiving the second connection control signal, if it is found that the movable end and the second non-movable end 15 of the first single-pole multi-throw switch 13 are already in a connected state, the first single-pole multi-throw switch 13 continues maintaining the state; if it is found that the movable end and the second non-movable end 15 of the first single-pole multi-throw switch 13 are not in a connected state, the first single-pole multi-throw switch 13 may perform an operation of connecting the movable end and the second non-movable end 15 of the first single-pole multi-throw switch 13.

Optionally, the foregoing time for sending may further include time when it is determined that the movable end 23 and the second non-movable end 15 of the first single-pole multi-throw switch 13 are not in a connected state. Therefore, after receiving the second connection control signal, the first single-pole multi-throw switch 13 may directly perform an operation of connecting the movable end and the second non-movable end 15 of the first single-pole multi-throw switch 13.

In this embodiment of the present disclosure, time for sending the first connection control signal may be time when a frequency band used by the Wi-Fi signal transmitted using the signal transmit pin 12 connected to the first single-pole multi-throw switch 13 does not generate interference to a frequency band used by the foregoing signal of the communications standard different from the Wi-Fi communications standard. After receiving the first connection control signal, if it is found that the movable end and the first non-movable end 14 of the first single-pole multi-throw switch 13 are already in a connected state, the first single-pole multi-throw switch 13 continues maintaining the state; otherwise, the first single-pole multi-throw switch 13 may perform an operation of connecting the movable end and the first non-movable end 14.

Optionally, the time for sending the first connection control signal may further include time when it is determined that the movable end 23 and the first non-movable end 14 of the first single-pole multi-throw switch 13 are not in a connected state. Therefore, after receiving the first connection control signal, the first single-pole multi-throw switch 13 may directly perform an operation of connecting the movable end and the first non-movable end 14 of the first single-pole multi-throw switch 13.

Optionally, the circuit may include multiple first single-pole multi-throw switches 13.

Optionally, the first single-pole multi-throw switch 13 included in the circuit may include more than two non-movable ends. The more than two non-movable ends included in the first single-pole multi-throw switch 13 may include only one first non-movable end 14 connected to the first signal transmit tributary 16, and other non-movable ends may all be the second non-movable ends 15 connected to the second signal transmit tributaries 17; or may include only one second non-movable end 15 connected to the second signal transmit tributary 17, and other non-movable ends may all be the first non-movable ends 14 connected to the first signal transmit tributaries 16; or may include multiple second non-movable ends 15 connected to the second signal transmit tributaries 17, and multiple first non-movable ends 14 connected to the first signal transmit tributaries 16.

It should be noted that, for a case in which the first single-pole multi-throw switch 13 includes multiple second non-movable ends 15 connected to the second signal transmit tributaries 17, when a Wi-Fi signal is transmitted on the second signal transmit tributaries 17, the Wi-Fi signal may be transmitted on only one second signal transmit tributary 17, and other second signal transmit tributaries 17 are used as standby second signal transmit tributaries 17; similarly, for a case in which the first single-pole multi-throw switch 13 includes multiple the first non-movable ends 14 connected to the first signal transmit tributaries 16, when a Wi-Fi signal is transmitted on the first signal transmit tributaries 16, the Wi-Fi signal may be transmitted on only one first signal transmit tributary 16, and other first signal transmit tributaries 16 are used as standby first signal transmit tributaries 16.

By using the foregoing circuit provided in this embodiment of the present disclosure, after the first single-pole multi-throw switch 13 connects, under control of a connection control signal transmitted by the Wi-Fi chip 11 connected to the first single-pole multi-throw switch 13, the movable end 23 of the first single-pole multi-throw switch 13 and the second non-movable end 15 of the first single-pole multi-throw switch 13, a Wi-Fi signal transmitted by the signal transmit pin 12 connected to the first single-pole multi-throw switch 13 undergoes attenuation of transmit power performed by the attenuator connected to the second non-movable end 15; therefore, the circuit has a function with which the Wi-Fi signal transmitted by the signal transmit pin 12 connected to the first single-pole multi-throw switch 13 is enabled to be attenuated, so as to reduce impact of the Wi-Fi signal on a signal of another communications standard that is received by a device in which the Wi-Fi chip 11 is disposed.

Optionally, the foregoing circuit provided in this embodiment of the present disclosure may further use but is not limited to using the following structures.

Structure 1: The circuit further includes a band-pass filter and a radio-frequency signal transceiver antenna.

For example, to implement transmission of a Wi-Fi signal of a specific frequency band, the circuit provided in this embodiment of the present disclosure may further include a first band-pass filter connected in series to the first non-movable end 14 of the first single-pole multi-throw switch 13 and include a first radio-frequency signal transceiver antenna connected in series to the first band-pass filter. An input end of the first band-pass filter is connected to the first non-movable end, and an output end of the first band-pass filter is connected to the first radio-frequency signal transceiver antenna.

In addition, the circuit provided in this embodiment of the present disclosure may further include a second band-pass filter and a second radio-frequency signal transceiver antenna. An input end of the second band-pass filter is connected to an output end of the power attenuator 18, and an output end of the second band-pass filter is connected to the second radio-frequency signal transceiver antenna.

Structure 2: The circuit provided in this embodiment of the present disclosure includes a band-pass filter 19, a radio-frequency signal transceiver antenna 20, and a second single-pole multi-throw switch 21.

A movable end 24 of the second single-pole multi-throw switch 21 is sequentially connected in series to the band-pass filter 19 and the radio-frequency signal transceiver antenna 20.

A first non-movable end of the second single-pole multi-throw switch 21 is connected to the first non-movable end 14 of the first single-pole multi-throw switch 13.

Figure 3:
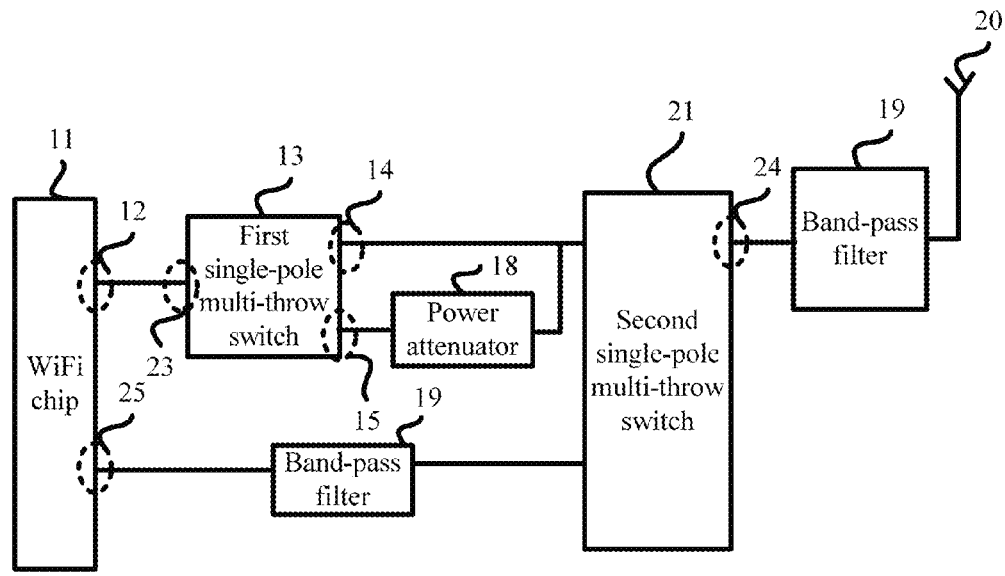
FIG. 3 is a schematic diagram of another structure of a circuit for avoiding channel interference according to an embodiment of the present disclosure.
Figure 4:
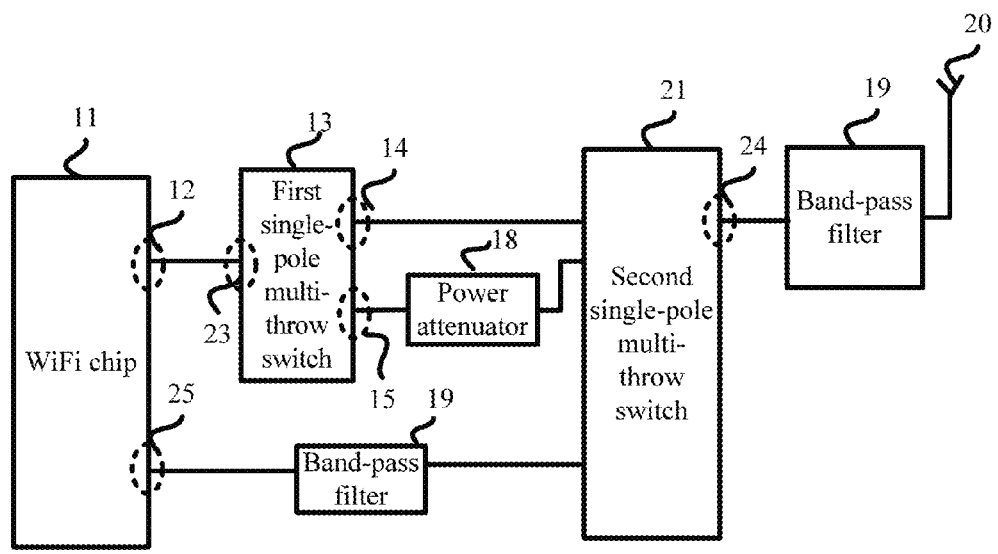
FIG. 4 is a schematic diagram of still another structure of a circuit for avoiding channel interference according to an embodiment of the present disclosure.

An output end of the power attenuator 18 in the second signal transmit tributary 17 is connected to a non-movable end of the second single-pole multi-throw switch 21, where the non-movable end of the second single-pole multi-throw switch 21 that is connected to the output end of the power attenuator 18 may be the same as (as shown in FIG. 3), or may be different from (as shown in FIG. 4) a non-movable end, connected to the first non-movable end of the first single-pole multi-throw switch 13, of the second single-pole multi-throw switch 21.

In Structure 2, in another non-movable end that is different from the foregoing "a non-movable end" and included in the second single-pole multi-throw switch 21, there is a non-movable end that is sequentially connected in series to the band-pass filter 19 and a signal receive pin 25 of the Wi-Fi chip.

Based on a connection manner of the second single-pole multi-throw switch 21 in this embodiment of the present disclosure, the second single-pole multi-throw switch 21 may connect, under control of a connection control signal transmitted by the Wi-Fi chip, the movable end 24 and the foregoing "a non-movable end" of the second single-pole multi-throw switch 21, or the movable end 24 and the other non-movable end of the second single-pole multi-throw switch 21.

For example, in a timeslot for sending a Wi-Fi signal, the Wi-Fi chip may send a third connection control signal to the second single-pole multi-throw switch 21, so as to control the second single-pole multi-throw switch 21 to connect the movable end 24 of the second single-pole multi-throw switch 21 and the non-movable end, connected to the power attenuator and the first non-movable end 14, of the second single-pole multi-throw switch 21; in a timeslot for receiving a Wi-Fi signal, the Wi-Fi chip may send a fourth connection control signal to the second single-pole multi-throw switch 21, so as to control the second single-pole multi-throw switch 21 to connect the movable end 24 of the second single-pole multi-throw switch 21 and the foregoing "another non-movable end" of the second single-pole multi-throw switch 21.

Figure 5:
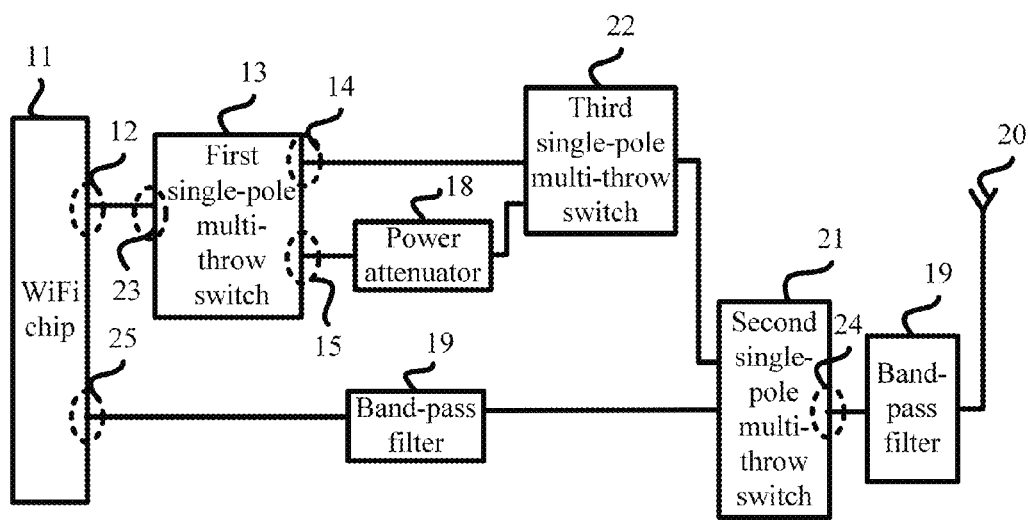
FIG. 5 is a schematic diagram of yet another structure of a circuit for avoiding channel interference according to an embodiment of the present disclosure.

Structure 3: For a schematic diagram of Structure 3, refer to FIG. 5. In FIG. 5, there may further be a third single-pole multi-throw switch 22 between the first single-pole multi-throw switch 13 and the second single-pole multi-throw switch 21.

Based on existence of the third single-pole multi-throw switch 22, a manner of a connection between a non-movable end of the second single-pole multi-throw switch 21 and the first non-movable end of the first single-pole multi-throw switch 13, as shown in FIG. 4, may be "implementing an indirect connection by using the third single-pole multi-throw switch 22", that is, the first non-movable end of the second single-pole multi-throw switch 21 is connected to a movable end of the third single-pole multi-throw switch 22, and a first non-movable end of the third single-pole multi-throw switch 22 is connected to the first non-movable end 14 of the first single-pole multi-throw switch 13.

Similarly, a manner of a connection between the output end of the power attenuator 18 and a non-movable end of the second single-pole multi-throw switch 21 may also be "implementing an indirect connection by using the third single-pole multi-throw switch 22", that is, the output end of the power attenuator 18 is connected to a second non-movable end of the third single-pole multi-throw switch 22, and the movable end of the third single-pole multi-throw switch 22 is connected to the first non-movable end of the second single-pole multi-throw switch 21.

In this embodiment of the present disclosure, the third single-pole multi-throw switch 22 may connect, under control of a connection control signal transmitted by the Wi-Fi chip, the movable end of the third single-pole multi-throw switch 22 and the first non-movable end of the third single-pole multi-throw switch 22, or the movable end of the third single-pole multi-throw switch 22 and the second non-movable end of the third single-pole multi-throw switch 22. For example, the third single-pole multi-throw switch 22 may connect, under control of a fifth connection control signal, the movable end of the third single-pole multi-throw switch 22 and the first non-movable end of the third single-pole multi-throw switch 22; or connect, under control of a sixth connection control signal, the movable end of the third single-pole multi-throw switch 22 and the second non-movable end of the third single-pole multi-throw switch 22. Time for sending the fifth connection control signal may be the same as the time for sending the first connection control signal in the foregoing; time for sending the sixth connection control signal may be the same as the time for sending the second connection control signal in the foregoing.

Figure 6:
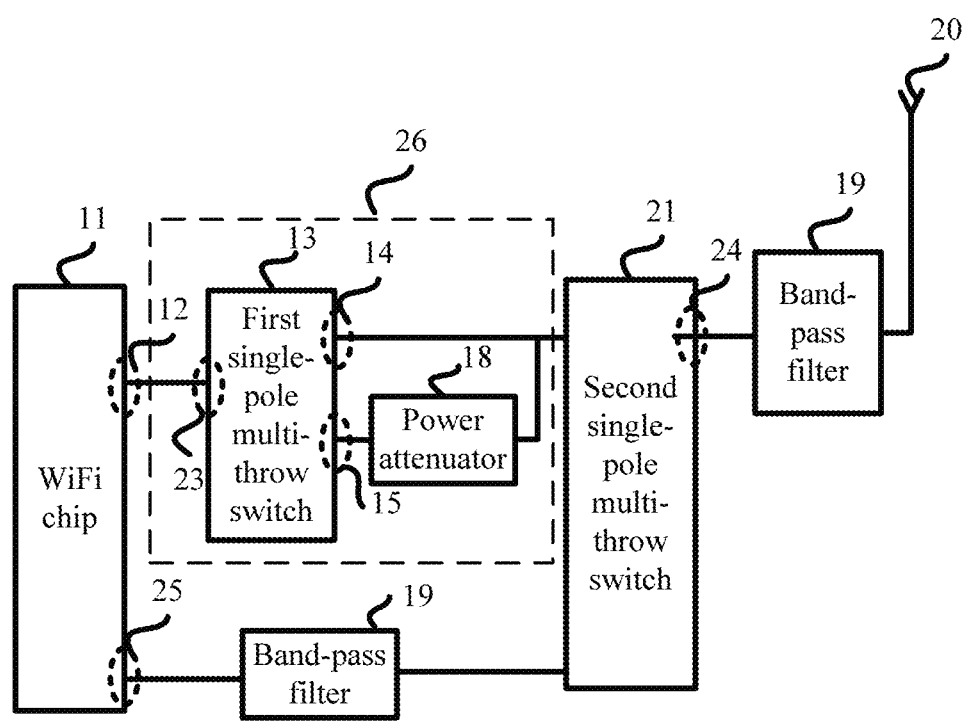
FIG. 6 is a schematic diagram of still yet another structure of a circuit for avoiding channel interference according to an embodiment of the present disclosure.

Structure 4: A schematic diagram of Structure 4 is shown in FIG. 6. The foregoing first single-pole multi-throw switch 13 and the power attenuator 18 may be included in a two-level adjustable attenuator 26 shown in FIG. 6.

In this embodiment of the present disclosure, it is equivalent to that the two-level adjustable attenuator has two gears (for example, a gear 1 and a gear 2, respectively). When the two-level adjustable attenuator works at the gear 1, the movable end 23 of the first single-pole multi-throw switch 13 is connected to the second non-movable end of the first single-pole multi-throw switch 13, such that power of a signal input into the two-level adjustable attenuator is attenuated by the power attenuator 18; when the two-level adjustable attenuator works at the gear 2, the two-level adjustable attenuator may merely be a signal transmission path, that is, the movable end 23 of the first single-pole multi-throw switch 13 is connected to the first non-movable end of the first single-pole multi-throw switch 13, such that the power of the signal input into the two-level adjustable attenuator is not attenuated by the power attenuator 18.

Actual implementation manners of the foregoing circuit provided in this embodiment of the present disclosure are described in detail in the following with reference to actual situations.

Embodiment 1

Figure 7:
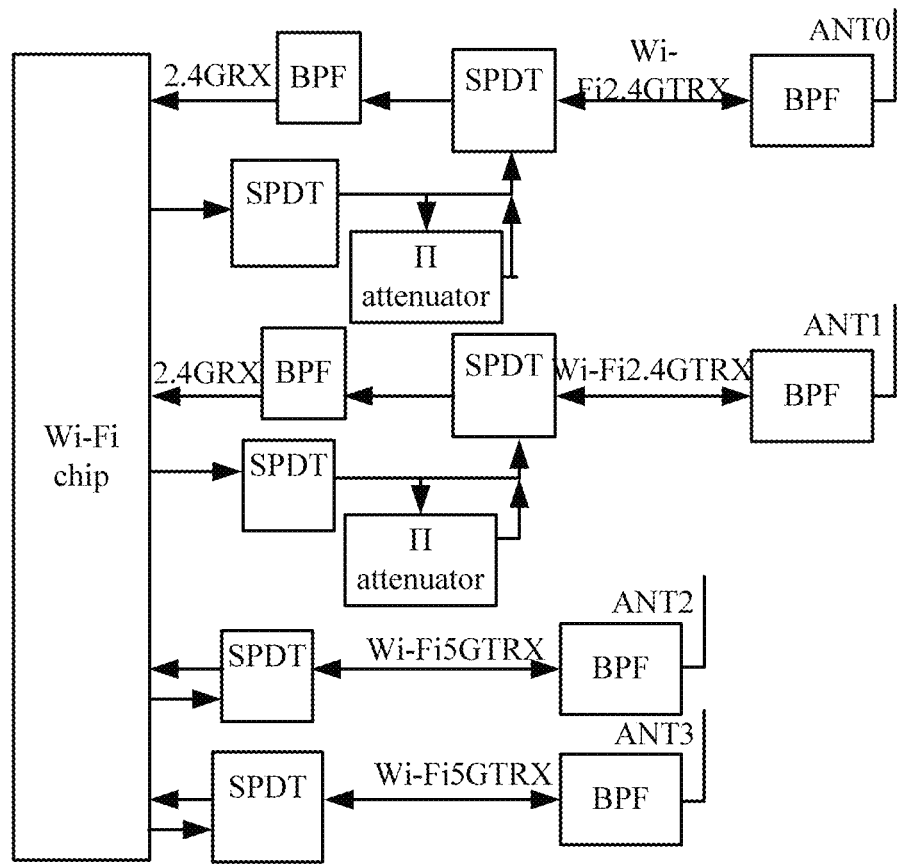
FIG. 7 is a schematic structural diagram of a circuit in a Mobile Wi-Fi terminal according to Embodiment 1.

In Embodiment 1, it is assumed that a Mobile Wi-Fi terminal may be in an environment in which an LTE system signal in an LTE B41 (2625 megahertz (MHz)-2655 MHz) frequency band coexists with a Wi-Fi signal; then according to a same idea as the circuit provided in the foregoing embodiment of the present disclosure, a structure of a circuit in the Mobile Wi-Fi terminal may be shown in FIG. 7.

In FIG. 7, a direction of an arrow of a line segment indicates a flow direction of a signal, an arrow pointing to a Wi-Fi chip indicates a flow direction of a signal received by the Wi-Fi chip, and an arrow deviating from the Wi-Fi chip indicates a flow direction of a signal transmitted by the Wi-Fi chip. A meaning of a direction of an arrow of a line segment in the subsequent accompanying drawings is the same as a meaning of a direction of an arrow of a line segment in FIG. 7, and details are not described in the following again.

Antennas ANT0 and ANT1 shown in FIG. 7 may be separately configured to receive a Wi-Fi signal, and after the Wi-Fi signal received by the antennas ANT0 and ANT1 sequentially passes through a band-pass filter (BPF), a Single-Pole Double-Throw switch (SPDT), and a BPF, the Wi-Fi signal is sent to the Wi-Fi chip using a signal receive pin (not shown in the figure) of the Wi-Fi chip, to undergo processing. Using any antenna as an example, a line that is sequentially connected to an antenna, a BPF, an SPDT switch, and a BPF, and is finally connected to a signal receive pin of a Wi-Fi chip may be referred to as a signal receive tributary. Optionally, depending on an actual signal processing requirement, devices included in a signal receive tributary in an actual application may also be different from the foregoing devices included in the signal receive tributary shown in FIG. 7.

In addition, the antennas ANT0 and ANT1 may also be configured to transmit a Wi-Fi signal. More specifically, a signal transmitted by a signal transmit pin (not shown in the figure) of the Wi-Fi chip is first sent to an SPDT; then, the Mobile Wi-Fi terminal (or may be an AP) controls the SPDT, such that the signal may be sent to a Π-type attenuator (Π attenuator for short) to perform attenuation on transmit power of a Wi-Fi signal and then enter an SPDT located in the signal receive tributary, and further be transmitted using an antenna. Alternatively, the Mobile Wi-Fi terminal (or may be an AP) controls the SPDT, such that on a premise that attenuation is not performed on transmit power of the signal, the signal directly enters an SPDT located in the signal receive tributary, and further be transmitted using an antenna.

It may be learned from the foregoing description that, between an SPDT connected to the signal transmit pin and an antenna, it is equivalent to that, there are the first signal transmit tributary and the second signal transmit tributary described in the foregoing. The Mobile Wi-Fi terminal (or may be the AP) controls the SPDT, such that a power attenuator included in the second signal transmit tributary may perform attenuation of transmit power on a Wi-Fi signal transmitted by the signal transmit pin, so as to reduce interference of the Wi-Fi signal to a signal of another communications standard that is received by the Mobile Wi-Fi terminal.

Figure 8:
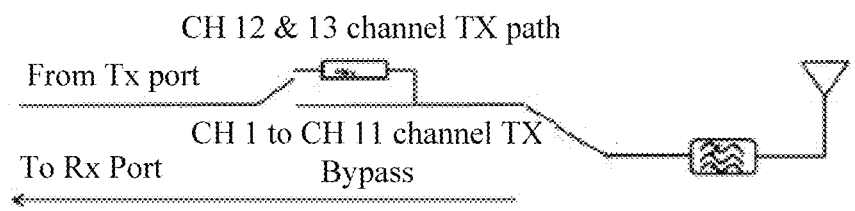
FIG. 8 is a partial schematic diagram of the circuit in the Mobile Wi-Fi terminal according to Embodiment 1.

For the first signal transmit tributary and the second signal transmit tributary that exist between the SPDT and the antenna, reference may be made to a partial schematic diagram of a circuit shown in FIG. 8. In FIG. 8, the SPDT is controlled, such that the Wi-Fi signal transmitted from the signal transmit pin (that is, a signal transmit port or Tx Port) may be transmitted in only one tributary of different preset signal transmit tributaries at the same time. For example, it is assumed that a channel over which the Wi-Fi signal is sent is a channel that generates interference to the signal of the other communications standard that is received by the Mobile Wi-Fi terminal, for example, the channel is the $12^{th}$ channel and the $13^{th}$ channel (CH 12&13); then, the SPDT is controlled, such that a signal transmit tributary (that is, the second signal transmit tributary) connected to an attenuator is connected to the Tx Port such that the Wi-Fi signal is transmitted after transmit power of the Wi-Fi signal is attenuated. On the contrary, if a channel over which the Wi-Fi signal is sent is a channel that does not generate interference to the signal of the other communications standard that is received by the Mobile Wi-Fi terminal, for example, the channel is the $1^{st}$ channel to the $11^{th}$ channel (CH 1 to 11); then, the SPDT is controlled, such that a signal transmit tributary (that is, the first signal transmit tributary) that is not connected to the attenuator is connected to the Tx Port such that the Wi-Fi signal is transmitted in a case in which transmit power is not attenuated.

An advantage of the circuit shown in FIG. 7 lies in that only one SPDT and one attenuator need to be added to a transmit tributary of a Wi-Fi signal, such that control logic of the circuit is simple, and an AP may be used to implement control on an SPDT.

Embodiment 2

Figure 9:
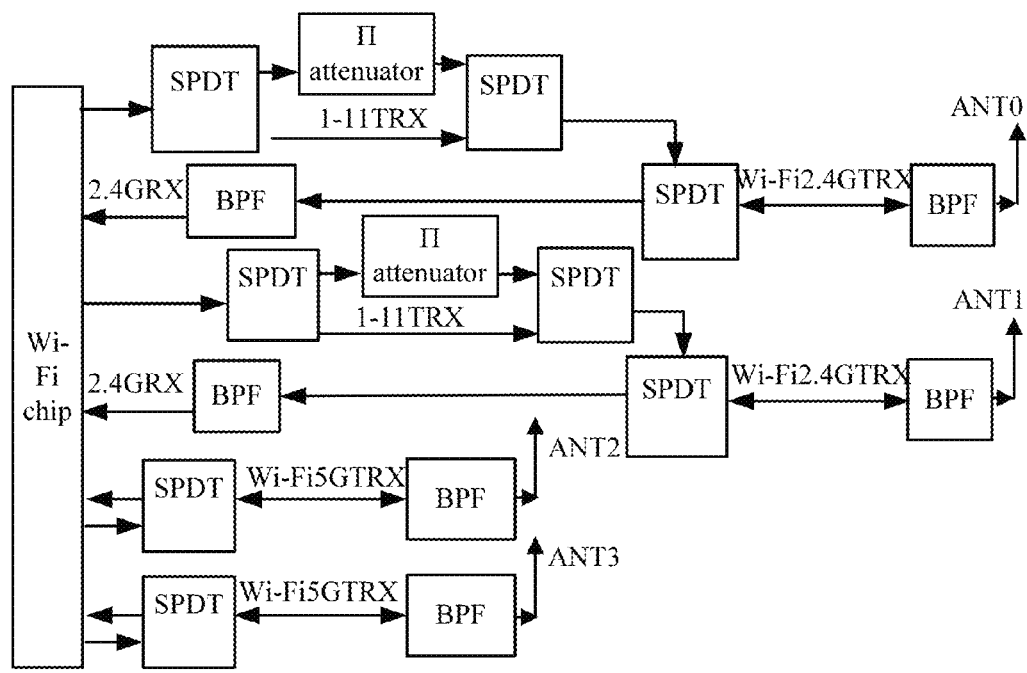
FIG. 9 is a schematic structural diagram of a circuit in a Mobile Wi-Fi terminal according to Embodiment 2.

In Embodiment 2, a structure of a circuit in a Mobile Wi-Fi terminal is shown in FIG. 9. Based on the structure of the circuit, a signal transmitted by a signal transmit pin (not shown in the figure) of a Wi-Fi chip is first sent to an SPDT; then, the Mobile Wi-Fi terminal (or may be an AP) controls the SPDT, such that the signal may be sent to a Π-type attenuator (Π attenuator) for attenuation of transmit power and then enter another SPDT. Then, the signal that has undergone attenuation enters an SPDT located in a signal receive tributary again and is further transmitted using an antenna. Alternatively, the Mobile Wi-Fi terminal (or may be an AP) controls the SPDT, such that on a premise that attenuation is not performed on transmit power of the signal, the signal directly enters the foregoing other SPDT, and further the signal is transmitted using an antenna after entering an SPDT located in the signal receive tributary.

It may be learned from the foregoing description that, between an SPDT connected to the signal transmit pin and an antenna, it is equivalent to that, there are the first signal transmit tributary and the second signal transmit tributary described in the foregoing. The Mobile Wi-Fi terminal (or may be the AP) controls the SPDT, such that a power attenuator included in the second signal transmit tributary may perform attenuation of transmit power on a Wi-Fi signal transmitted by the signal transmit pin, so as to reduce interference of the Wi-Fi signal to a signal of another communications standard that is received by the Mobile Wi-Fi terminal.

Figure 10:
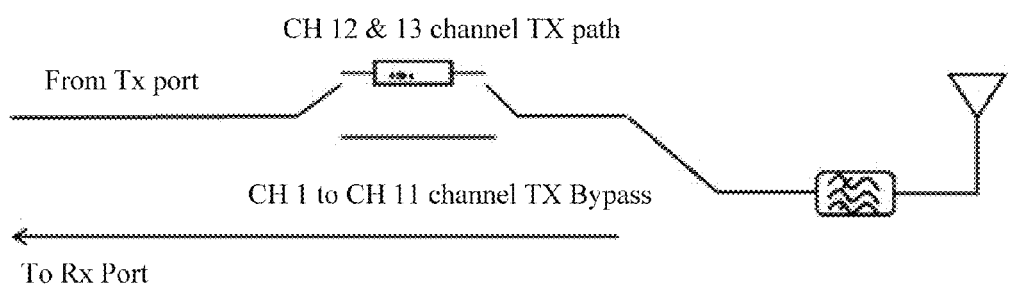
FIG. 10 is a partial schematic diagram of the circuit in the Mobile Wi-Fi terminal according to Embodiment 2.

For the first signal transmit tributary and the second signal transmit tributary that exist between the SPDT and the antenna, reference may be made to a partial circuit diagram shown in FIG. 10. In FIG. 10, the SPDT is controlled, such that the Wi-Fi signal transmitted from the signal transmit pin (that is, a signal transmit port or Tx Port) may be transmitted in only one tributary of different preset signal transmit tributaries at the same time. For example, it is assumed that a channel over which the Wi-Fi signal is sent is a channel that generates interference to the signal of the other communications standard that is received by the Mobile Wi-Fi terminal, for example, the channel is the $12^{th}$ channel and the $13^{th}$ channel (CH 12&13); then, the SPDT is controlled, such that a signal transmit tributary (that is, the second signal transmit tributary) connected to an attenuator is connected to the Tx Port such that the Wi-Fi signal is transmitted after transmit power of the Wi-Fi signal is attenuated. On the contrary, if a channel over which the Wi-Fi signal is sent is a channel that does not generate interference to the signal of the other communications standard that is received by the Mobile Wi-Fi terminal, for example, the channel is the $1^{st}$ channel to the $11^{th}$ channel (CH 1 to 11); then, the SPDT is controlled, such that a signal transmit tributary (that is, the first signal transmit tributary) that is not connected to the attenuator is connected to the Tx Port such that the Wi-Fi signal is transmitted in a case in which transmit power is not attenuated.

In Embodiment 2, control on SPDTs in the first signal transmit tributary and the second signal transmit tributary may also be implemented by the AP.

Embodiment 3

Figure 11:
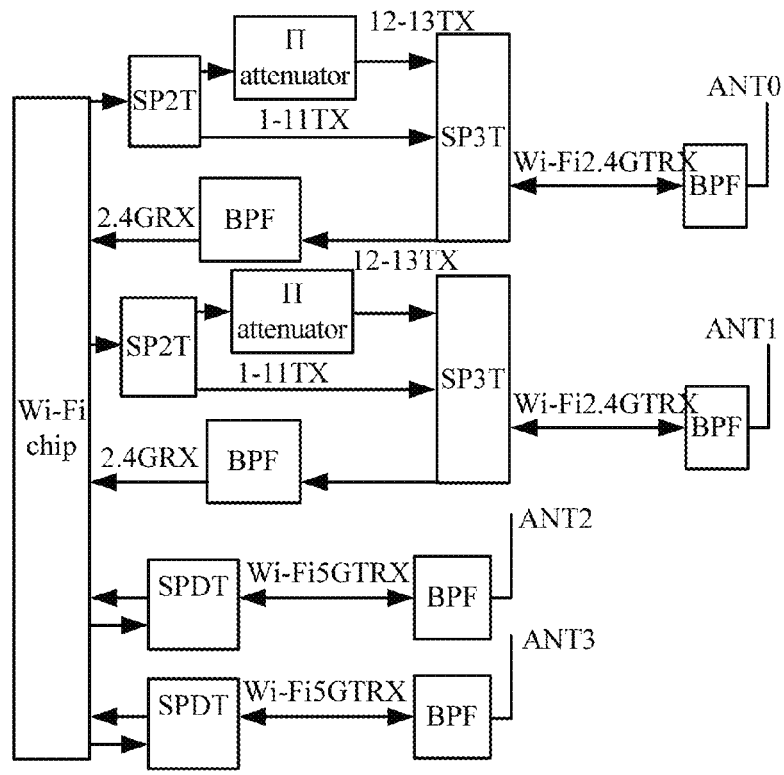
FIG. 11 is a schematic structural diagram of a circuit in a Mobile Wi-Fi terminal according to Embodiment 3.

In Embodiment 3, a structure of a circuit in a Mobile Wi-Fi terminal is shown in FIG. 11. Based on the structure of the circuit, a signal transmitted by a signal transmit pin (not shown in the figure) of a Wi-Fi chip is first sent to an SPDT; then, the Mobile Wi-Fi terminal (or may be an AP) controls the SPDT, such that the signal may be sent to a H attenuator for attenuation of transmit power, and then enters a single-pole triple-throw (SP3T) switch, and further be transmitted using an antenna. The SP3T switch is also located in a signal receive tributary. Alternatively, the Mobile Wi-Fi terminal (or may be an AP) controls the SPDT, such that on a premise that attenuation is not performed on transmit power of the signal, the signal directly enters the foregoing SP3T switch, and further is transmitted using an antenna.

Figure 12:
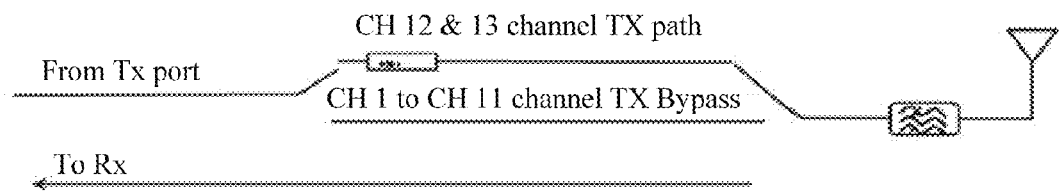
FIG. 12 is a partial schematic diagram of the circuit in the Mobile Wi-Fi terminal according to Embodiment 3.

For a first signal transmit tributary and a second signal transmit tributary that exist between the SPDT and the antenna, reference may be made to a partial circuit diagram shown in FIG. 12. In FIG. 12, the SPDT is controlled, such that a Wi-Fi signal transmitted from the signal transmit pin (that is, a signal transmit port or Tx Port) may be transmitted in only one tributary of different preset signal transmit tributaries at the same time. For example, it is assumed that a channel over which the Wi-Fi signal is sent is a channel that generates interference to a signal of another communications standard that is received by the Mobile Wi-Fi terminal, for example, the channel is the $12^{th}$ channel and the $13^{th}$ channel (CH 12&13); then, the SPDT is controlled, such that a signal transmit tributary (that is, the second signal transmit tributary) connected to an attenuator is connected to the Tx Port such that the Wi-Fi signal is transmitted after transmit power of the Wi-Fi signal is attenuated. On the contrary, if a channel over which the Wi-Fi signal is sent is a channel that does not generate interference to a signal of another communications standard that is received by the Mobile Wi-Fi terminal, for example, the channel is the 1st channel to the $11^{th}$ channel (CH 1 to 11); then, the SPDT is controlled, such that a signal transmit tributary (that is, the first signal transmit tributary) that is not connected to the attenuator is connected to the Tx Port such that the Wi-Fi signal is transmitted in a case in which transmit power is not attenuated.

Embodiment 4

Figure 13:
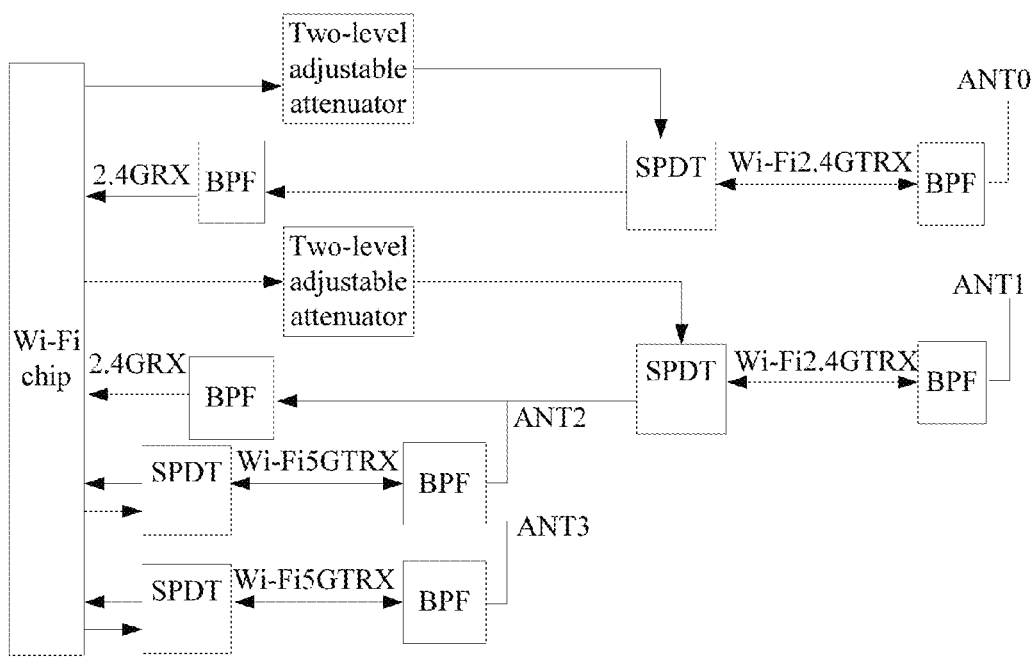
FIG. 13 is a schematic structural diagram of a circuit in a Mobile Wi-Fi terminal according to Embodiment 4.

In Embodiment 4, a structure of a circuit in a Mobile Wi-Fi terminal is shown in FIG. 13.

A signal transmitted by a signal transmit pin (not shown in the figure) of a Wi-Fi chip is sent to a two-level adjustable attenuator, and then, a signal output by the adjustable attenuator enters an SPDT located in a signal receive tributary and further is transmitted using an antenna.

Figure 14:
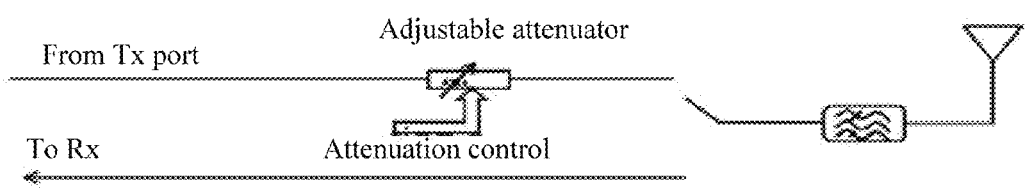
FIG. 14 is a partial schematic diagram of the circuit in the Mobile Wi-Fi terminal according to Embodiment 4.

In Embodiment 4, the two-level adjustable attenuator may be an attenuator including two gears (which are a gear 1 and a gear 2, respectively), and for a working principle of the attenuator, reference may be made to a partial circuit diagram shown in FIG. 14. When a working mode of the attenuator is controlled to be at the gear 1, the attenuator is equivalent to a common power attenuator whose working mode is not adjustable, that is, it is equivalent to that, as described in the foregoing, the second signal transmit tributary and the signal transmit pin of the Wi-Fi chip are in a connected state, such that a transmit power attenuator in the second signal transmit tributary is in a working state; when the working mode of the attenuator is controlled to be at the gear 2, the attenuator may merely be a signal transmission path, that is, it is equivalent to that, a first signal transmit tributary and the signal transmit pin of the Wi-Fi chip are in a connected state.

An advantage of Embodiment 4 lies in that a switchover between two modes, that is, between performing attenuation of transmit power and skipping performing attenuation of transmit power on a Wi-Fi signal, may be implemented merely using one adjustable attenuator, which is easy for control.

Figure 15:
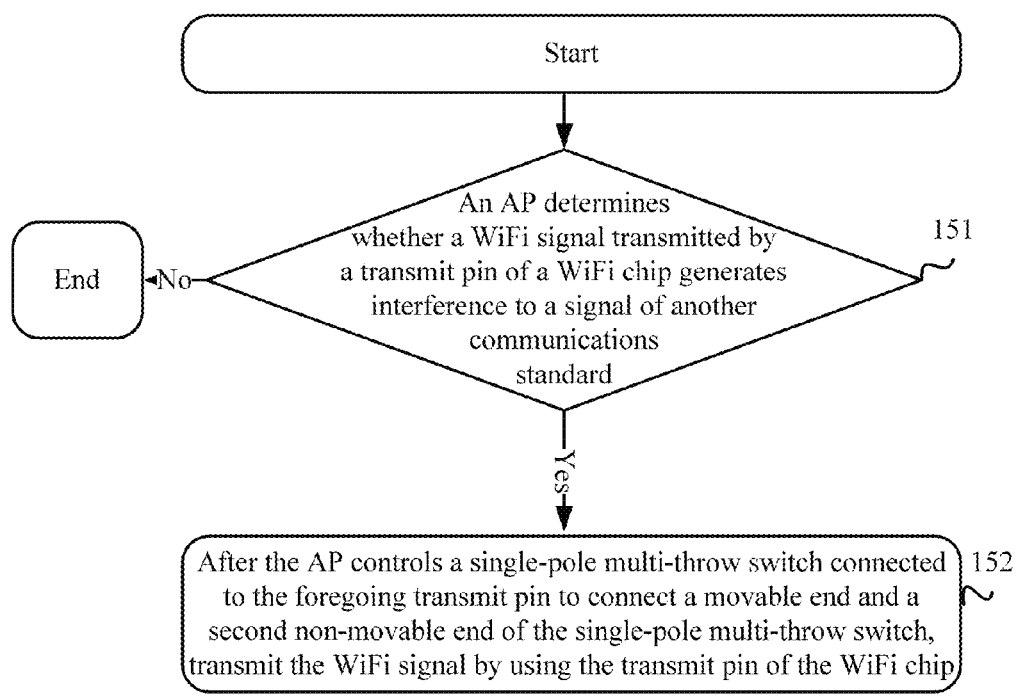
FIG. 15 is a schematic flowchart of a method for avoiding channel interference according to an embodiment of the present disclosure.

Based on a circuit for avoiding channel interference provided in this embodiment of the present disclosure, an embodiment of the present disclosure further provides a method for avoiding channel interference, so as to resolve a problem in the prior art that because a 2.4G Wi-Fi signal transmitted by a Mobile Wi-Fi terminal interferes with a WiMAX (or LTE) system signal, a handover failure occurs when the Mobile Wi-Fi terminal is handed over between 2.4G Wi-Fi and a WiMAX (or LTE) system. A schematic flowchart for implementation of the method is shown in FIG. 15, where the method includes the following steps.

Step 151: An AP determines whether a Wi-Fi signal transmitted by a signal transmit pin of a Wi-Fi chip disposed in a Mobile Wi-Fi terminal generates interference to a signal of a communications standard different from a Wi-Fi communications standard; and if a result of the determining is yes, perform step 152; otherwise, the procedure may end.

For example, when a Mobile Wi-Fi terminal in which a Wi-Fi chip is disposed detects that there is, on an uplink WAN side of the Mobile Wi-Fi terminal, a signal that is of the communications standard different from the Wi-Fi communications standard and whose signal strength is greater than a preset signal strength threshold, the AP may determine whether a frequency band used by the Wi-Fi signal transmitted by the Wi-Fi chip using the signal transmit pin generates interference to a frequency band used by the signal that is of the communications standard different from the Wi-Fi communications standard and is detected by the Mobile Wi-Fi terminal, and when the result of the determining is yes, step 152 is performed; otherwise, the procedure may end.

Step 152: After the AP controls a single-pole multi-throw switch connected to the foregoing signal transmit pin to connect a movable end and a second non-movable end of the single-pole multi-throw switch, transmit the Wi-Fi signal using the signal transmit pin of the Wi-Fi chip.

It should be noted that, the foregoing single-pole multi-throw switch meets the following: 1. The movable end of the single-pole multi-throw switch is connected to the signal transmit pin; and 2. the single-pole multi-throw switch includes at least two non-movable ends, a first non-movable end of the at least two non-movable ends is connected to a first signal transmit tributary, and the second non-movable end of the at least two non-movable ends is connected to a second signal transmit tributary, where the second signal transmit tributary includes a power attenuator, and an input end of the power attenuator is connected to the second non-movable end of the single-pole multi-throw switch.

Figure 16:
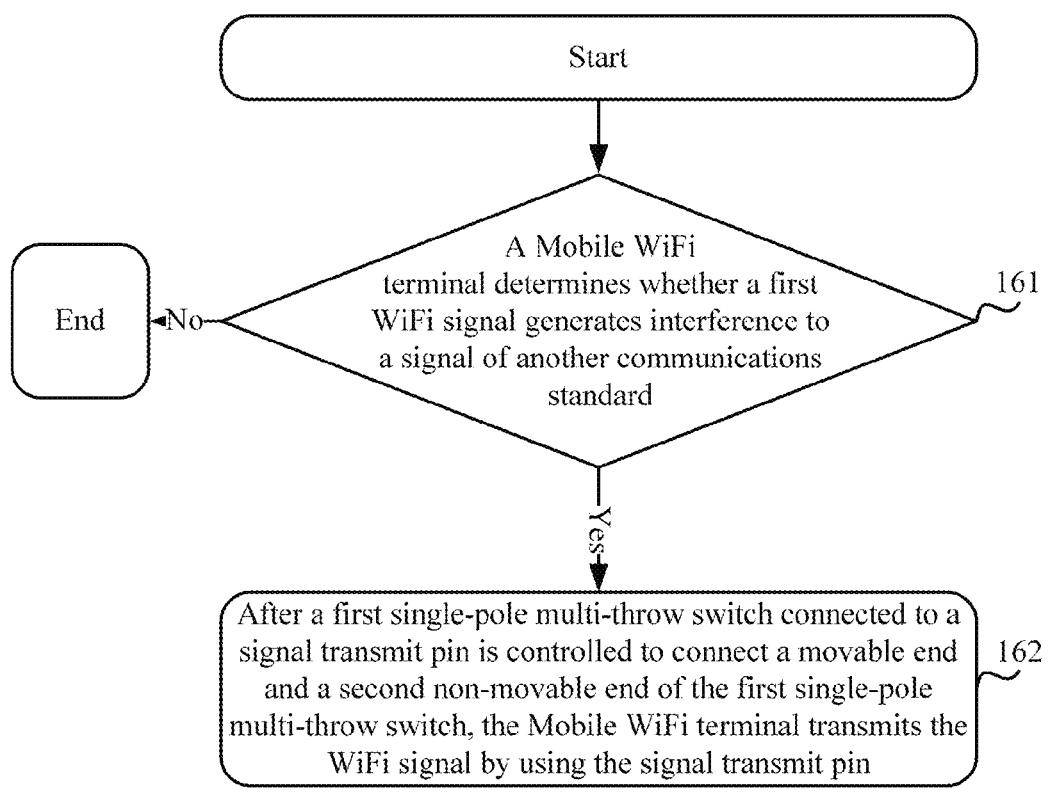
FIG. 16 is a schematic flowchart of another method for avoiding channel interference according to an embodiment of the present disclosure.

In addition, an embodiment of the present disclosure further provides a method for avoiding channel interference, where the method includes the following steps shown in FIG. 16.

Step 161: A Mobile Wi-Fi terminal in which a Wi-Fi chip is disposed determines whether a first Wi-Fi signal transmitted using a signal transmit pin of the Wi-Fi chip generates interference to a signal of a communications standard different from a Wi-Fi communications standard; and when a result of the determining is yes, perform step 162; otherwise, the procedure may end.

For example, when the Mobile Wi-Fi terminal in which the Wi-Fi chip is disposed detects that there is, on an uplink WAN side of the Mobile Wi-Fi terminal, a signal that is of the communications standard different from the Wi-Fi communications standard and whose signal strength value is greater than a preset first signal strength threshold, the Mobile Wi-Fi terminal determines whether a frequency band used by the Wi-Fi signal transmitted using the signal transmit pin of the Wi-Fi chip generates interference to a frequency band used by the foregoing signal that is of the communications standard different from the Wi-Fi communications standard and is detected by the Mobile Wi-Fi terminal; and when the result of the determining is yes, step 162 is performed; otherwise, the procedure may end.

Step 162: After a first single-pole multi-throw switch connected to the foregoing signal transmit pin is controlled to connect a movable end of the first single-pole multi-throw switch and a second non-movable end of the first single-pole multi-throw switch, the Mobile Wi-Fi terminal transmits the Wi-Fi signal using the signal transmit pin.

The foregoing first single-pole multi-throw switch meets the following: 1. The movable end of the first single-pole multi-throw switch is connected to the signal transmit pin; and 2. at least two non-movable ends are included, a first non-movable end of the at least two non-movable ends is connected to a first signal transmit tributary, and a second non-movable end of the at least two non-movable ends is connected to a second signal transmit tributary, where the second signal transmit tributary includes a power attenuator, and an input end of the power attenuator is connected to the second non-movable end of the first single-pole multi-throw switch.

In the foregoing steps, the signal of the communications standard different from the Wi-Fi communications standard may be but is not limited to an LTE system signal and/or a WiMAX system signal.

Optionally, after the foregoing step 162 is performed to enable that the Mobile Wi-Fi terminal transmits the Wi-Fi signal using the signal transmit pin, the Mobile Wi-Fi terminal may further perform the following steps: the Mobile Wi-Fi terminal determines, by scanning a frequency band that does not generate interference to a frequency band used by the signal of the communications standard different from the Wi-Fi communications standard and is used by a Wi-Fi signal that can be transmitted by the Wi-Fi chip, whether there is a second Wi-Fi signal that uses the frequency band that does not generate interference to the frequency band used by the signal of the communications standard different from the Wi-Fi communications standard; when a result of the determining is that there is the foregoing second Wi-Fi signal, and it is determined that a detected signal strength value of the second Wi-Fi signal is greater than a preset second signal strength threshold, after the first single-pole multi-throw switch is controlled to enable the movable end of the first single-pole multi-throw switch not connect to the first non-movable end or the second non-movable end of the first single-pole multi-throw switch, the Mobile Wi-Fi terminal requests to access an AP corresponding to information about an AP in an AP list of Wi-Fi to which the second Wi-Fi signal belongs, where the AP list may include information about one or more APs; and if the Mobile Wi-Fi terminal successfully accesses an AP corresponding to information about the AP in the AP list of the Wi-Fi to which the second Wi-Fi signal belongs, disconnecting the Mobile Wi-Fi terminal from another network on a WAN side that is different from the Wi-Fi to which the second Wi-Fi signal belongs may be performed.

However, if the Mobile Wi-Fi terminal does not successfully access an AP corresponding to information about any AP in the AP list of the Wi-Fi to which the second Wi-Fi signal belongs, after the first single-pole multi-throw switch is controlled to enable the first single-pole multi-throw switch to connect to the movable end and the second non-movable end of the first single-pole multi-throw switch, the Mobile Wi-Fi terminal may transmit the first Wi-Fi signal using the signal transmit pin connected to the first single-pole multi-throw switch.

Optionally, when the result of the determining is that there is no such second Wi-Fi signal, the Mobile Wi-Fi terminal may further determine, by scanning a frequency band that generates interference to a frequency band used by the signal of the communications standard different from the Wi-Fi communications standard and is used by a Wi-Fi signal that can be transmitted by the Wi-Fi chip, whether there is a third Wi-Fi signal in the frequency band that generates interference to the frequency band used by the signal of the communications standard different from the Wi-Fi communications standard, where Wi-Fi to which the third Wi-Fi signal belongs is different from Wi-Fi to which the first Wi-Fi signal transmitted by the signal transmit pin belongs.

When it is determined that there is the third Wi-Fi signal, the Mobile Wi-Fi terminal further determines whether a signal strength value of the third Wi-Fi signal meets a preset condition, where the preset condition includes a condition that enables the Mobile Wi-Fi terminal to be capable of accessing an AP corresponding to the third Wi-Fi signal, and enables a value of an extent to which the signal of the communications standard different from the Wi-Fi communications standard interferes with the third Wi-Fi signal to be not greater than a preset interference extent threshold.

If the Mobile Wi-Fi terminal determines that the signal strength value of the third Wi-Fi signal meets the foregoing preset condition, after the foregoing first single-pole multi-throw switch is controlled to enable the movable end of the first single-pole multi-throw switch not to connect to the first non-movable end or the second non-movable end of the first single-pole multi-throw switch, the Mobile Wi-Fi terminal may request to access an AP list of the Wi-Fi to which the third Wi-Fi signal belongs, where the AP list may include information about one or more APs. If the Mobile Wi-Fi terminal successfully accesses an AP corresponding to information about the AP in the AP list of the Wi-Fi to which the third Wi-Fi signal belongs, the Mobile Wi-Fi terminal may be disconnected from another network on the WAN side different from the Wi-Fi to which the third Wi-Fi signal belongs.

Optionally, if the Mobile Wi-Fi terminal does not successfully access an AP corresponding to information about any AP in the AP list of the Wi-Fi to which the third Wi-Fi signal belongs, after the first single-pole multi-throw switch is controlled to enable the first single-pole multi-throw switch to connect to the movable end and the second non-movable end of the first single-pole multi-throw switch, the Mobile Wi-Fi terminal may transmit the first Wi-Fi signal using the signal transmit pin connected to the first single-pole multi-throw switch.

Optionally, the Mobile Wi-Fi terminal may use the following manner to determine whether the signal strength value of the third Wi-Fi signal meets the preset condition.

First, the Mobile Wi-Fi terminal determines whether the signal strength value of the third Wi-Fi signal is greater than a preset third signal strength threshold, where the third signal strength threshold is a minimum signal strength value, which enables the Mobile Wi-Fi terminal to be capable of accessing the Wi-Fi to which the third Wi-Fi signal belongs, of the third Wi-Fi signal; then, when it is determined that the signal strength value of the third Wi-Fi signal is greater than the third signal strength threshold, the Mobile Wi-Fi terminal determines whether the signal strength value of the third Wi-Fi signal is greater than a preset fourth signal strength threshold, where the fourth signal strength threshold is a minimum signal strength value, which enables the value of the extent to which the signal of the communications standard different from the Wi-Fi communications standard interferes with the third Wi-Fi signal to be not greater than the foregoing preset interference extent threshold, of the third Wi-Fi signal.

According to the foregoing method provided in this embodiment of the present disclosure, when there is, on an uplink WAN side of a Mobile Wi-Fi terminal, a signal that is of a communications standard different from a Wi-Fi communications standard and whose signal strength value is greater than a preset first signal strength threshold, and when a frequency band used by a Wi-Fi signal transmitted by a signal transmit pin of a Wi-Fi chip generates interference to a frequency band used by the foregoing signal that is of the communications standard different from the Wi-Fi communications standard and is detected by the Mobile Wi-Fi terminal, attenuation of transmit power of the Wi-Fi signal may be performed. Therefore, compared with the prior art, the foregoing method provided in this embodiment of the present disclosure may avoid a problem in the prior art that, because a 2.4G Wi-Fi signal transmitted by a Mobile Wi-Fi terminal interferes a WiMAX (or LTE) system signal, a handover failure occurs when the Mobile Wi-Fi terminal is handed over between 2.4G Wi-Fi and a WiMAX (or LTE) system, or 2.4G Wi-Fi cannot coexist with a WiMAX (or LTE) system.

An actual implementation manner of the foregoing method is described in detail in the following by introducing Embodiment 5.

Embodiment 5

In an actual application, a first single-pole multi-throw switch in a circuit provided in this embodiment of the present disclosure may be controlled by an AP, or may be controlled by a Mobile Wi-Fi terminal in which the circuit is disposed. It is assumed that, in Embodiment 5, avoiding interference of a Wi-Fi signal to an LTE system signal is mainly to be implemented, and it is assumed that the circuit provided in this embodiment of the present disclosure is disposed in the Mobile Wi-Fi terminal; then, for the AP, when a Wi-Fi signal sent by the Mobile Wi-Fi terminal uses a Wi-Fi channel that may interfere with an LTE system signal, the AP may control the first single-pole multi-throw switch to reduce transmit power of the Wi-Fi signal, so as to avoid interference of the Wi-Fi signal to an LTE system signal received by the Mobile Wi-Fi terminal. Similarly, for the Mobile Wi-Fi terminal, the Mobile Wi-Fi terminal may also use a manner similar to the foregoing processing manner to implement avoiding interference of a Wi-Fi signal transmitted by a Wi-Fi chip to the LTE system signal received by the Mobile Wi-Fi terminal.

Figure 17:
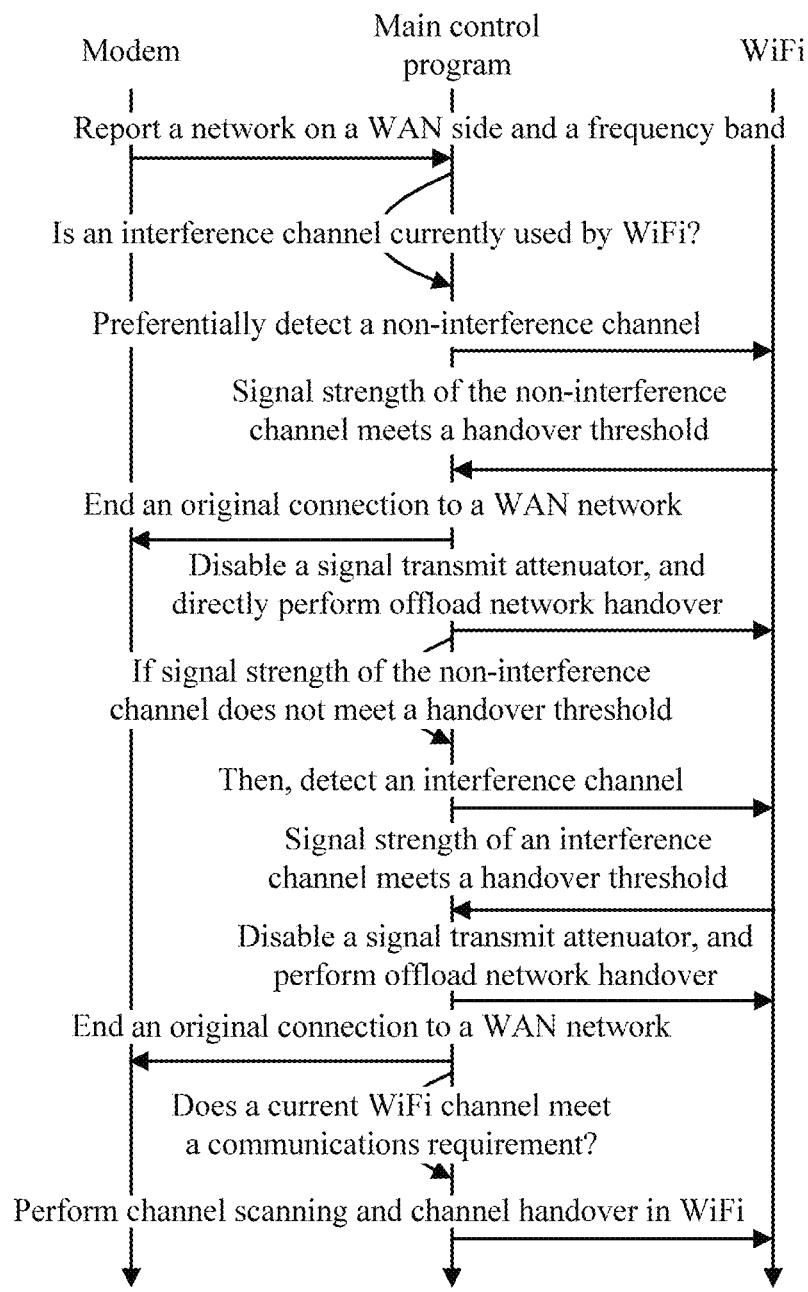
FIG. 17 is a schematic diagram of a time sequence of controlling a first single-pole multi-throw switch by a Mobile Wi-Fi terminal using a main control program in an implementation scenario.

Further, if it is assumed that a physical device that controls the first single-pole multi-throw switch in Embodiment 5 is the Mobile Wi-Fi terminal, and more specifically, the Mobile Wi-Fi terminal uses a main control program set in the Mobile Wi-Fi terminal to control the first single-pole multi-throw switch; then, a schematic diagram of a time sequence of controlling a first single-pole multi-throw switch using a main control program by a Mobile Wi-Fi terminal in an implementation scenario is shown in FIG. 17. A main meaning of the schematic diagram of the time sequence is as follows.

First, a modem reports, to the Mobile Wi-Fi terminal, information about a network on an uplink WAN side currently accessed by the Mobile Wi-Fi terminal and information about a frequency band used by a signal currently sent by the Mobile Wi-Fi terminal; when the Mobile Wi-Fi terminal determines, according to the information, reported by the modem, about the network on the uplink WAN side currently accessed by the Mobile Wi-Fi terminal, that the Mobile Wi-Fi terminal currently accesses a WiMAX system or an LTE system on the uplink WAN side, the Mobile Wi-Fi terminal determines, according to the information, reported by the modem, about a frequency band used by the signal currently sent by the Mobile Wi-Fi terminal, whether a Wi-Fi signal to be currently sent by the Mobile Wi-Fi terminal generates interference to a WiMAX or LTE system signal; if the Mobile Wi-Fi terminal determines that the Wi-Fi signal to be currently sent by the Mobile Wi-Fi terminal generates interference to the WiMAX or LTE system signal, the Mobile Wi-Fi terminal further detects a Wi-Fi channel that does not generate interference to the WiMAX or LTE system signal and that is in a Wi-Fi channel used by a Wi-Fi signal that can be sent by the Mobile Wi-Fi terminal, that is, detects a non-interference channel; if the Mobile Wi-Fi terminal detects that there is a Wi-Fi signal in the non-interference channel, and a signal strength value of the Wi-Fi signal is greater than a preset handover threshold, the Mobile Wi-Fi terminal controls the first single-pole multi-throw switch, so as to disable a transmit power attenuator, and be switched to accessing Wi-Fi to which the Wi-Fi signal in the non-interference channel belongs; if the switching is successful, the Mobile Wi-Fi terminal is disconnected from another network on the uplink WAN side; and if the switching fails, the Mobile Wi-Fi terminal controls the first single-pole multi-throw switch, so as to enable the transmit power attenuator; if the Mobile Wi-Fi terminal detects that there is the Wi-Fi signal in the non-interference channel, but the strength value of the Wi-Fi signal is not greater than the preset handover threshold, the Mobile Wi-Fi terminal further detects a Wi-Fi channel that generates interference to the WiMAX or LTE system signal and that is in a Wi-Fi channel used by the Wi-Fi signal that can be sent by the Mobile Wi-Fi terminal, that is, detects an interference channel; if the Mobile Wi-Fi terminal detects that there is a Wi-Fi signal in the interference channel, and a strength value of the Wi-Fi signal is greater than the preset handover threshold, the Mobile Wi-Fi terminal controls the first single-pole multi-throw switch, so as to disable a transmit power attenuator, and be switched to accessing Wi-Fi to which the Wi-Fi signal in the interference channel belongs; if the switching is successful, the Mobile Wi-Fi terminal disconnects the Mobile Wi-Fi terminal from the other network on the uplink WAN side, and if the switching fails, the Mobile Wi-Fi terminal controls the first single-pole multi-throw switch, so as to enable the transmit power attenuator.

It should be noted that, once the Mobile Wi-Fi terminal is switched to accessing Wi-Fi to which the Wi-Fi signal detected by the Mobile Wi-Fi terminal belongs, the Mobile Wi-Fi terminal may further determine whether a channel used by a Wi-Fi signal sent by the Mobile Wi-Fi terminal meets a communications requirement, and perform, when it is determined that the communications requirement is not met, channel scanning and channel handover operations in the Wi-Fi currently accessed by the Mobile Wi-Fi terminal. The Mobile Wi-Fi terminal detects a network on an uplink WAN side of another communications standard until no Wi-Fi signals meet the communications requirement. If it is found by means of detection that the network on the uplink WAN side is a WiMAX or LTE network and meets the communications requirement, the Mobile Wi-Fi terminal is handed over to the network on the uplink WAN side.

Figure 18A:
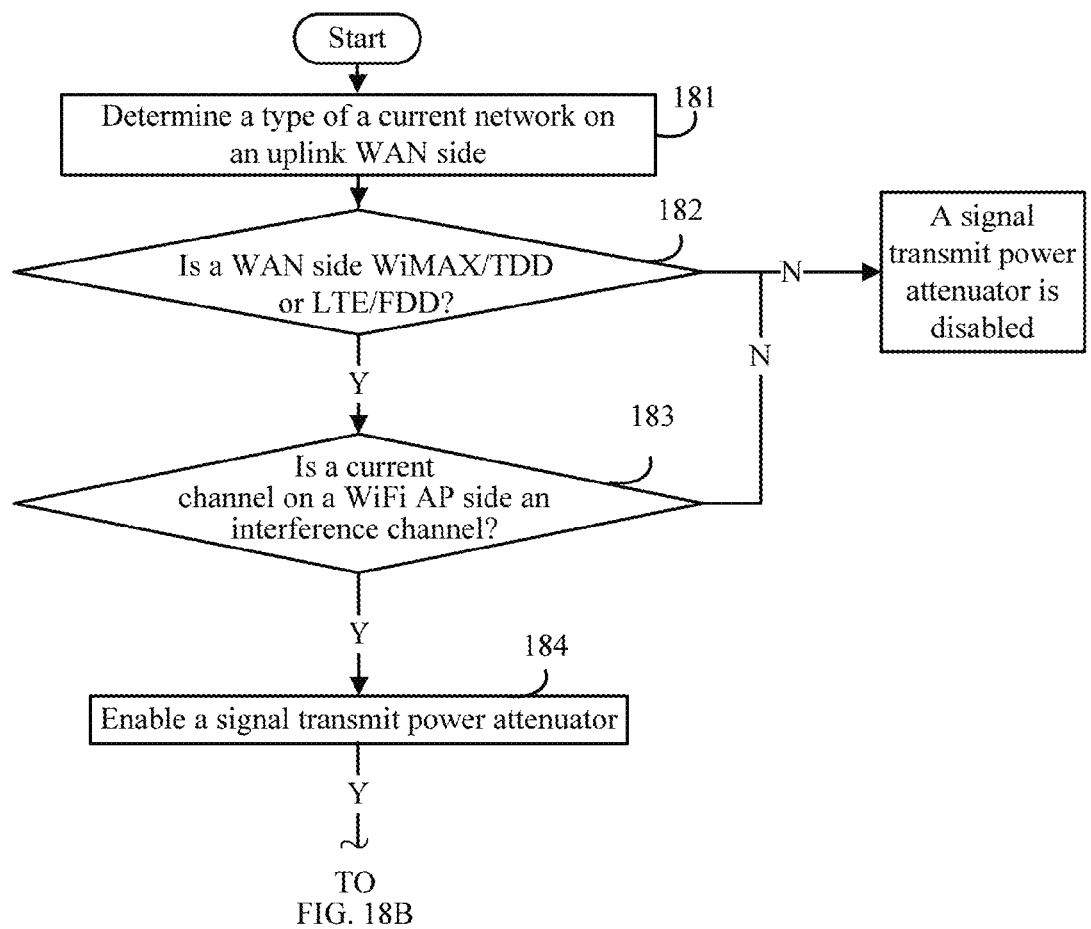
FIG. 18A, FIG. 18B and FIG. 18C are a schematic flowchart of an application of a solution in an implementation scenario according to an embodiment of the present disclosure.
Figure 18B:
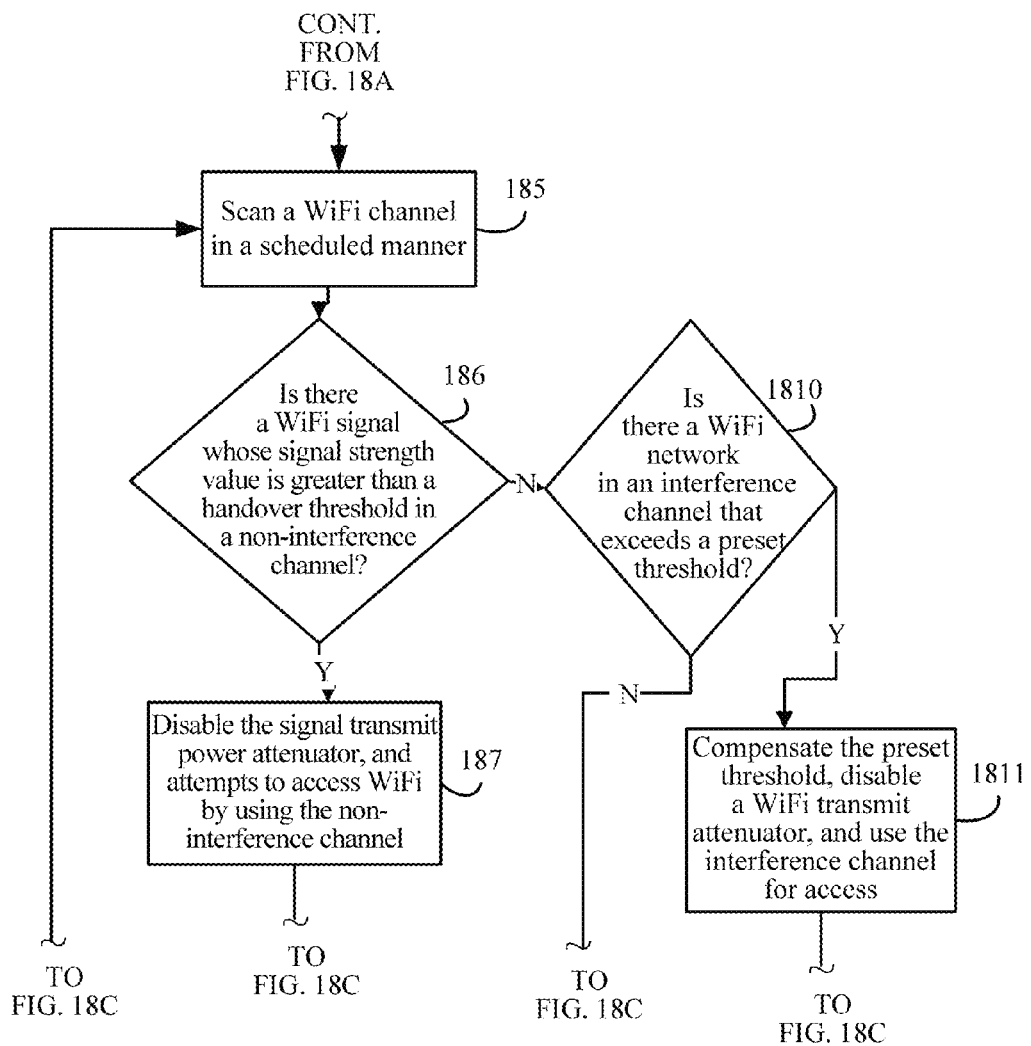
Figure 18C:
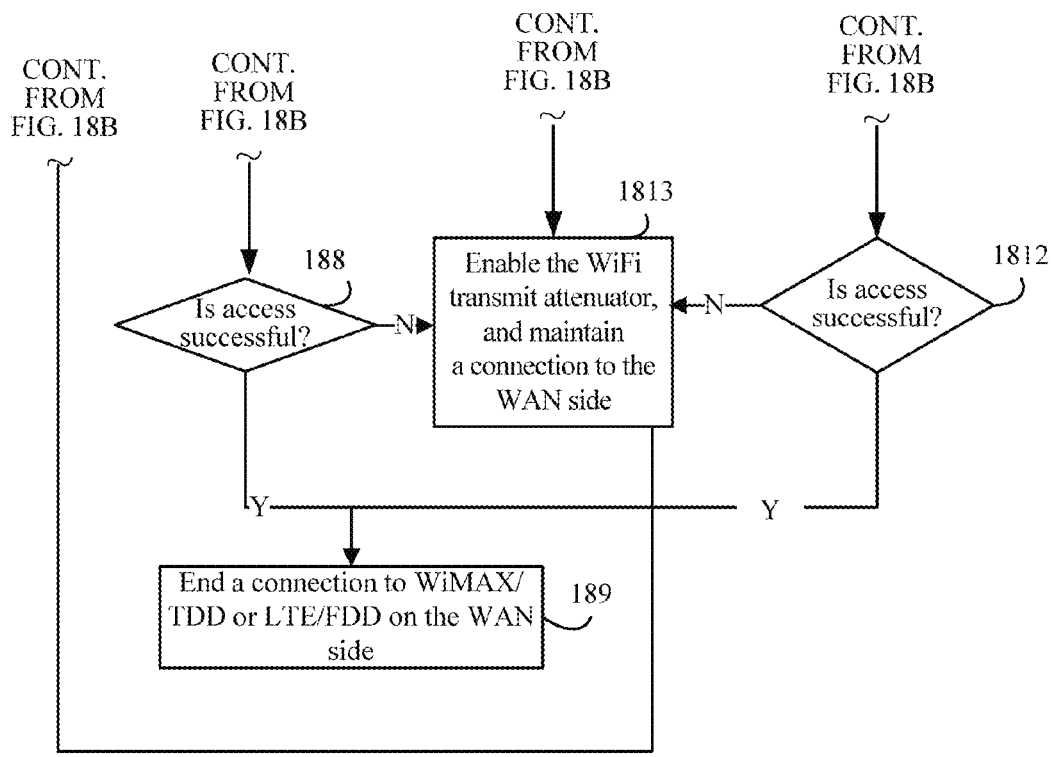

A flowchart corresponding to the foregoing schematic diagram of a time sequence is shown in FIG. 18A, FIG. 18B, and FIG. 18C, and includes the following steps.

Step 181: A Mobile Wi-Fi terminal determines a type of a network on an uplink WAN side of the Mobile Wi-Fi terminal.

Step 182: Determine whether the type of the network on the uplink WAN side is a WiMAX network or an LTE network.

When a result of the determining is yes, step 183 is performed; otherwise, a transmit power attenuator is enabled to be in a non-working state.

Step 183: The Mobile Wi-Fi terminal determines whether a Wi-Fi signal sent by the Mobile Wi-Fi terminal uses an interference channel.

If a result of the determining is yes, step 184 is performed; otherwise, a transmit power attenuator in a second signal transmit tributary included in the Mobile Wi-Fi terminal is enabled to be in a non-working state.

Step 184: The Mobile Wi-Fi terminal controls a first single-pole multi-throw switch, such that a transmit power attenuator is in a working state.

Step 185: The Mobile Wi-Fi terminal scans, in a scheduled manner, a channel that can be used by a Wi-Fi signal.

Step 186: The Mobile Wi-Fi terminal determines whether there is a Wi-Fi signal whose signal strength value is greater than a preset handover threshold in a scanned non-interference channel, and when a result of the determining is yes, perform step 187; otherwise, perform step 1810.

Step 187: The Mobile Wi-Fi terminal controls the first single-pole multi-throw switch, such that the transmit power attenuator is in a non-working state and attempts to access Wi-Fi to which the Wi-Fi signal that is in the non-interference channel and whose signal strength value is greater than the preset handover threshold belongs.

Step 188: The Mobile Wi-Fi terminal determines whether the Wi-Fi to which the Wi-Fi signal that is in the non-interference channel and whose signal strength value is greater than the preset handover threshold belongs is successfully accessed, and when a result of the determining is yes, perform step 189; otherwise, perform step 1813.

Step 189: The Mobile Wi-Fi terminal disconnects the Mobile Wi-Fi terminal from another uplink WAN (for example, the WiMAX network or the LTE network) different from the Wi-Fi, the procedure ends, and subsequent steps are not performed.

Step 1810: The Mobile Wi-Fi terminal determines whether there is a Wi-Fi signal whose signal strength value is greater than the preset handover threshold in a scanned non-interference channel, and when a result of the determining is yes, perform step 1811; otherwise, perform step 1813.

Step 1811: The Mobile Wi-Fi terminal controls the first single-pole multi-throw switch, such that the transmit power attenuator is in a non-working state and attempts to access Wi-Fi to which the Wi-Fi signal that is in the interference channel and whose signal strength value is greater than the preset handover threshold belongs.

Step 1812: The Mobile Wi-Fi terminal determines whether the Wi-Fi to which the Wi-Fi signal that is in the interference channel and whose signal strength value is greater than the preset handover threshold belongs is successfully accessed, and when a result of the determining is yes, perform step 189; otherwise, perform step 1813.

Step 1813: The Mobile Wi-Fi terminal controls the first single-pole multi-throw switch, such that the transmit power attenuator is in a working state and continues maintaining a connection between the Mobile Wi-Fi terminal and another uplink WAN (for example, the WiMAX network or the LTE network) different from the Wi-Fi. After execution of step 1813 is completed, step 185 may further be performed.

It may be learned from the foregoing embodiment that the solution provided in this embodiment of the present disclosure may further bring the following beneficial effects: 1. An application of all frequency bands of Wi-Fi may be implemented. 2. Impact of a Wi-Fi channel on another frequency band may be minimized and the performance of Wi-Fi is ensured to the greatest extent. 3. The solution may be applied in a case in which an uplink WAN of a Mobile Wi-Fi terminal is a time division duplexing (TDD) network or a frequency division duplexing (FDD) network, such that the solution has a relatively wide application scope. 4. A rate of an LTE part is not affected, and user experience is better than time division multiplexing. 5. By detecting a Wi-Fi channel in a scheduled manner, it may be implemented that the Mobile Wi-Fi terminal is preferentially handed over to Wi-Fi that has a lower tariff without affecting use of a user, so as to reduce a tariff for the user.

Figure 19:
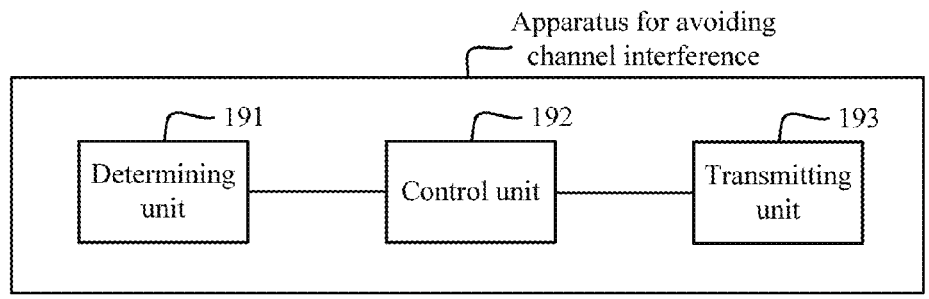
FIG. 19 is a schematic structural diagram of an apparatus for avoiding channel interference according to an embodiment of the present disclosure.

Based on a same idea as a method for avoiding channel interference provided in embodiments of the present disclosure, an embodiment of the present disclosure further provides an apparatus for avoiding channel interference shown in FIG. 19, including a determining unit 191 configured to determine whether a Wi-Fi signal transmitted by a signal transmit pin of a Wi-Fi chip disposed in a Mobile Wi-Fi terminal generates interference to a signal of a communications standard different from a Wi-Fi communications standard; a control unit 192 configured to, when a result of the determining that is obtained by the determining unit 191 is yes, control a movable end of a first single-pole multi-throw switch that is connected to the signal transmit pin to connect to a second non-movable end of the first single-pole multi-throw switch; and a transmitting unit 193 configured to, after the control unit 192 controls the movable end of the first single-pole multi-throw switch that is connected to the signal transmit pin to connect to the second non-movable end of the first single-pole multi-throw switch, transmit the Wi-Fi signal using the signal transmit pin, where the movable end of the first single-pole multi-throw switch is connected to the signal transmit pin; the first single-pole multi-throw switch includes at least two non-movable ends, a first non-movable end of the at least two non-movable ends is connected to a first signal transmit tributary, and the second non-movable end of the at least two non-movable ends is connected to a second signal transmit tributary; and the second signal transmit tributary includes a power attenuator, and an input end of the power attenuator is connected to the second non-movable end of the single-pole multi-throw switch.

Based on a same idea as another method for avoiding channel interference provided in embodiments of the present disclosure, an embodiment of the present disclosure further provides another apparatus for avoiding channel interference, where a Wi-Fi chip is disposed in the apparatus, and the apparatus includes the following functional units: a determining unit configured to determine whether a first Wi-Fi signal transmitted using a signal transmit pin of the Wi-Fi chip generates interference to a signal of a communications standard different from a Wi-Fi communications standard; a control unit configured to, when a result of the determining that is obtained by the determining unit is yes, control a movable end of a first single-pole multi-throw switch that is connected to the signal transmit pin to connect to a second non-movable end of the first single-pole multi-throw switch; and a transmitting unit configured to, after the control unit controls the movable end of the first single-pole multi-throw switch that is connected to the signal transmit pin to connect to the second non-movable end of the first single-pole multi-throw switch, transmit the first Wi-Fi signal using the signal transmit pin, where the movable end of the first single-pole multi-throw switch is connected to the signal transmit pin; the first single-pole multi-throw switch includes at least two non-movable ends, a first non-movable end of the at least two non-movable ends is connected to a first signal transmit tributary, and the second non-movable end of the at least two non-movable ends is connected to a second signal transmit tributary; and the second signal transmit tributary includes a power attenuator, and an input end of the power attenuator is connected to the second non-movable end of the first single-pole multi-throw switch.

Optionally, the apparatus for avoiding channel interference may further include a judging unit configured to, after the transmitting unit transmits the first Wi-Fi signal using the signal transmit pin, determine, by scanning a frequency band that does not generate interference to a frequency band used by the signal of the communications standard different from the Wi-Fi communications standard and is used by a Wi-Fi signal that can be transmitted by the Wi-Fi chip, whether there is a second Wi-Fi signal that uses the frequency band that does not generate interference to the frequency band used by the signal of the communications standard different from the Wi-Fi communications standard; an accessing unit configured to, when a result of the determining that is obtained by the judging unit is that there is the second Wi-Fi signal, and it is determined that a detected signal strength value of the second Wi-Fi signal is greater than a preset second signal strength threshold, after the first single-pole multi-throw switch is controlled to enable the movable end of the first single-pole multi-throw switch not connect to the first non-movable end or the second non-movable end of the first single-pole multi-throw switch, request to access an AP corresponding to the second Wi-Fi signal; and a disconnecting unit configured to, after the apparatus for avoiding channel interference successfully accesses the AP corresponding to the second Wi-Fi signal, disconnect the apparatus for avoiding channel interference from another network that is on the WAN side and different from Wi-Fi to which the second Wi-Fi signal belongs.

Optionally, the control unit may further be configured to, when the apparatus for avoiding channel interference does not successfully access an AP corresponding to the first Wi-Fi signal, control the movable end of the first single-pole multi-throw switch to connect to the second non-movable end of the first single-pole multi-throw switch; and the transmitting unit is further configured to, after the movable end of the first single-pole multi-throw switch is connected to the second non-movable end of the first single-pole multi-throw switch, transmit the first Wi-Fi signal using the signal transmit pin.

Optionally, the foregoing judging unit may further be configured to, when the result of the determining is that there is no such second Wi-Fi signal, determine, by scanning a frequency band that generates interference to the frequency band used by the signal of the communications standard different from the Wi-Fi communications standard and is used by a Wi-Fi signal that can be transmitted by the Wi-Fi chip, whether there is a third Wi-Fi signal in the frequency band that generates interference to the frequency band used by the signal of the communications standard different from the Wi-Fi communications standard, where Wi-Fi to which the third Wi-Fi signal belongs is different from Wi-Fi to which the first Wi-Fi signal belongs; and when it is determined that there is the third Wi-Fi signal, determine whether a signal strength value of the third Wi-Fi signal meets a preset condition, where the preset condition includes a condition that enables the apparatus for avoiding channel interference to be capable of accessing an AP corresponding to the third Wi-Fi signal, and enables a value of an extent to which the signal of another communications standard interferes with the third Wi-Fi signal to be not greater than a preset interference extent threshold; the accessing unit may further be configured to, when it is determined that the signal strength value of the third Wi-Fi signal meets the preset condition, after the movable end of the first single-pole multi-throw switch is controlled not to connect to the first non-movable end or the second non-movable end of the first single-pole multi-throw switch, request to access the AP corresponding to the third Wi-Fi signal; and the disconnecting unit may further be configured to, after the apparatus for avoiding channel interference successfully accesses the AP corresponding to the third Wi-Fi signal, disconnect the apparatus for avoiding channel interference from another network that is on the WAN side and different from the Wi-Fi to which the third Wi-Fi signal belongs.

Optionally, the control unit may further be configured to, when the apparatus for avoiding channel interference does not successfully access the Wi-Fi to which the third Wi-Fi signal belongs, control the movable end of the first single-pole multi-throw switch to connect to the second non-movable end of the first single-pole multi-throw switch; and the transmitting unit is further configured to, after the movable end of the first single-pole multi-throw switch is connected to the second non-movable end of the first single-pole multi-throw switch, transmit the first Wi-Fi signal using the signal transmit pin.

Optionally, the judging unit is configured to determine whether the signal strength value of the third Wi-Fi signal is greater than a preset third signal strength threshold, where the third signal strength threshold is a minimum signal strength value that enables the apparatus for avoiding channel interference to be capable of accessing the Wi-Fi to which the third Wi-Fi signal belongs; and when it is determined that the signal strength value of the third Wi-Fi signal is greater than the third signal strength threshold, determine whether the signal strength value of the third Wi-Fi signal is greater than a preset fourth signal strength threshold, where the fourth signal strength threshold is a minimum signal strength value, which enables the value of the extent to which the signal of the other communications standard interferes with the third Wi-Fi signal to be not greater than the preset interference extent threshold, of the third Wi-Fi signal.

Figure 20:
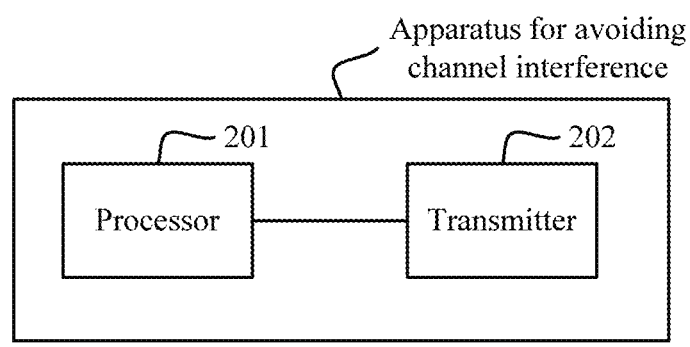
FIG. 20 is a schematic structural diagram of another apparatus for avoiding channel interference according to an embodiment of the present disclosure.

Based on a same idea as a method for avoiding channel interference provided in embodiments of the present disclosure, an embodiment of the present disclosure further provides an apparatus for avoiding channel interference shown in FIG. 20, where the apparatus includes the following functional entities: a processor 201 configured to determine whether a Wi-Fi signal transmitted by a signal transmit pin of a Wi-Fi chip disposed in a Mobile Wi-Fi terminal generates interference to a signal of a communications standard different from a Wi-Fi communications standard, and when a result of the determining is yes, control a movable end of a first single-pole multi-throw switch that is connected to the signal transmit pin to connect to the second non-movable end of the first single-pole multi-throw switch; and a transmitter 202 configured to, after the processor 201 controls the movable end of the first single-pole multi-throw switch that is connected to the signal transmit pin to connect to the second non-movable end of the first single-pole multi-throw switch, transmit the Wi-Fi signal using the signal transmit pin, where the movable end of the first single-pole multi-throw switch is connected to the signal transmit pin; the first single-pole multi-throw switch includes at least two non-movable ends, a first non-movable end of the at least two non-movable ends is connected to a first signal transmit tributary, and the second non-movable end of the at least two non-movable ends is connected to a second signal transmit tributary; and the second signal transmit tributary includes a power attenuator, and an input end of the power attenuator is connected to the second non-movable end of the first single-pole multi-throw switch.

Based on a same idea as another method for avoiding channel interference provided in embodiments of the present disclosure, an embodiment of the present disclosure further provides another apparatus for avoiding channel interference, where a Wi-Fi chip is disposed in the apparatus, and the apparatus includes the following functional entities: a processor configured to determine whether a first Wi-Fi signal transmitted using a signal transmit pin of the Wi-Fi chip generates interference to a signal of a communications standard different from a Wi-Fi communications standard, and when a result of the determining is yes, control a movable end of a first single-pole multi-throw switch that is connected to the signal transmit pin to connect to a second non-movable end of the first single-pole multi-throw switch; and a transmitter configured to, after the processor controls the movable end of the first single-pole multi-throw switch that is connected to the signal transmit pin to connect to the second non-movable end of the first single-pole multi-throw switch, transmit the first Wi-Fi signal using the signal transmit pin, where the movable end of the first single-pole multi-throw switch is connected to the signal transmit pin; the first single-pole multi-throw switch includes at least two non-movable ends, a first non-movable end of the at least two non-movable ends is connected to a first signal transmit tributary, and the second non-movable end of the at least two non-movable ends is connected to a second signal transmit tributary; and the second signal transmit tributary includes a power attenuator, and an input end of the power attenuator is connected to the second non-movable end of the first single-pole multi-throw switch.

Optionally, the processor is further configured to determine, by scanning a frequency band that does not generate interference to a frequency band used by the signal of the communications standard different from the Wi-Fi communications standard and is used by a Wi-Fi signal that can be transmitted by the Wi-Fi chip, whether there is a second Wi-Fi signal that uses the frequency band that does not generate interference to the frequency band used by the signal of the communications standard different from the Wi-Fi communications standard; when a result of the determining is that there is the second Wi-Fi signal, and it is determined that a detected signal strength value of the second Wi-Fi signal is greater than a preset second signal strength threshold, after the first single-pole multi-throw switch is controlled to enable the movable end of the first single-pole multi-throw switch not connect to the first non-movable end or the second non-movable end of the first single-pole multi-throw switch, request to access an AP corresponding to the second Wi-Fi signal; and after the apparatus for avoiding channel interference successfully accesses the AP corresponding to the second Wi-Fi signal, disconnect the apparatus for avoiding channel interference from another network that is on the WAN side and different from Wi-Fi to which the second Wi-Fi signal belongs.

Optionally, the processor is further configured to, when the apparatus for avoiding channel interference does not successfully access an AP corresponding to the first Wi-Fi signal, control the movable end of the first single-pole multi-throw switch to connect to the second non-movable end of the first single-pole multi-throw switch; and the transmitter is further configured to, after the movable end of the first single-pole multi-throw switch is connected to the second non-movable end of the first single-pole multi-throw switch, transmit the first Wi-Fi signal using the signal transmit pin.

Optionally, the processor is further configured to, when the result of the determining is that there is no such second Wi-Fi signal, determine, by scanning a frequency band that generates interference to the frequency band used by the signal of the communications standard different from the Wi-Fi communications standard and is used by a Wi-Fi signal that can be transmitted by the Wi-Fi chip, whether there is a third Wi-Fi signal in the frequency band that generates interference to the frequency band used by the signal of the communications standard different from the Wi-Fi communications standard, where Wi-Fi to which the third Wi-Fi signal belongs is different from Wi-Fi to which the first Wi-Fi signal belongs; when the apparatus for avoiding channel interference determines that there is the third Wi-Fi signal, determine whether a signal strength value of the third Wi-Fi signal meets a preset condition, where the preset condition includes a condition that enables the apparatus for avoiding channel interference to be capable of accessing an AP corresponding to the third Wi-Fi signal, and enables a value of an extent to which the signal of another communications standard interferes with the third Wi-Fi signal to be not greater than a preset interference extent threshold; when it is determined that the signal strength value of the third Wi-Fi signal meets the preset condition, after the movable end of the first single-pole multi-throw switch is controlled not to connect to the first non-movable end or the second non-movable end of the first single-pole multi-throw switch, request to access the AP corresponding to the third Wi-Fi signal; and after the apparatus for avoiding channel interference successfully accesses the AP corresponding to the third Wi-Fi signal, disconnect the apparatus for avoiding channel interference from another network that is on the WAN side and different from the Wi-Fi to which the third Wi-Fi signal belongs.

Optionally, the processor is further configured to, when the apparatus for avoiding channel interference does not successfully access the Wi-Fi to which the third Wi-Fi signal belongs, after the movable end of the first single-pole multi-throw switch is controlled to connect to the second non-movable end of the first single-pole multi-throw switch, transmit the first Wi-Fi signal using the signal transmit pin.

Optionally, the processor may be configured to determine whether the signal strength value of the third Wi-Fi signal is greater than a preset third signal strength threshold, where the third signal strength threshold is a minimum signal strength value that enables the apparatus for avoiding channel interference to be capable of accessing the Wi-Fi to which the third Wi-Fi signal belongs; and when it is determined that the signal strength value of the third Wi-Fi signal is greater than the third signal strength threshold, determine whether the signal strength value of the third Wi-Fi signal is greater than a fourth signal strength threshold, where the fourth signal strength threshold is a minimum signal strength value, which enables the value of the extent to which the signal of the other communications standard interferes with the third Wi-Fi signal to be not greater than a preset interference extent threshold, of the third Wi-Fi signal.

Persons skilled in the art should understand that the embodiments of the present disclosure may be provided as a method, a system, or a computer program product. Therefore, the present disclosure may use a form of hardware only embodiments, software only embodiments, or embodiments with a combination of software and hardware. Furthermore, the present disclosure may adopt forms of computer program products implemented in one or multiple computer available storage media (including but not limited to disk memories, compact disc read-only memories (CD-ROMs), optical memories including computer available program code.

The present disclosure is described with reference to the flowcharts and/or block diagrams of the method, the device (system), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, such that the instructions executed by a computer or a processor of any other programmable data processing device generate an apparatus for implementing a function in one or more processes in the flowcharts and/or in one or more blocks in the block diagrams.

These computer program instructions may also be stored in a computer readable memory that can instruct the computer or any other programmable data processing device to work in a specific manner, such that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, such that a series of operations and steps are performed on the computer or the other programmable device, thereby generating computer-implemented processing. Therefore, the instructions executed on the computer or the other programmable device provide steps for implementing a specific function in one or more processes in the flowcharts and/or in one or more blocks in the block diagrams.

Although some preferred embodiments of the present disclosure have been described, persons skilled in the art can make changes and modifications to these embodiments once they learn the basic concept. Therefore, the following claims are intended to be construed as to cover the preferred embodiments and all changes and modifications falling within the scope of the present disclosure.

Persons skilled in the art can make various modifications and variations to the present disclosure without departing from the spirit and scope of the present disclosure. The present disclosure is intended to cover these modifications and variations provided that they fall within the scope of protection defined by the following claims and their equivalent technologies.

What is claimed is:

1. A circuit for avoiding channel interference, comprising:
   a wireless local area network Wireless Fidelity (Wi-Fi) chip; and
   at least one first single-pole multi-throw switch,
   wherein a movable end of the first single-pole multi-throw switch is connected to a signal transmit pin of the Wi-Fi chip, wherein the first single-pole multi-throw switch comprises at least two non-movable ends, wherein a first non-movable end of the at least two non-movable ends is connected to a first signal transmit tributary, wherein a second non-movable end of the at least two non-movable ends is connected to a second signal transmit tributary, wherein the second signal transmit tributary comprises a power attenuator, wherein an input end of the power attenuator is connected to the second non-movable end of the first single-pole multi-throw switch, wherein, when the Wi-Fi chip determines that a first channel and a second channel interfere with each other, the movable end of the first single-pole multi-throw switch is controlled to connect to the second non-movable end of the first single-pole multi-throw switch, wherein the first channel is a wireless local area network channel, and wherein the second channel is different from the wireless local area network channel.

2. The circuit according to claim 1, wherein the circuit further comprises a second single-pole multi-throw switch, wherein a band-pass filter and a radio-frequency signal transceiver antenna are sequentially connected in series to a movable end of the second single-pole multi-throw switch, wherein a first non-movable end of the second single-pole multi-throw switch is connected to the first non-movable end of the first single-pole multi-throw switch, wherein an output end of the power attenuator is connected to the first non-movable end of the second single-pole multi-throw switch, wherein a second non-movable end of the second single-pole multi-throw switch is connected to a signal receive pin of the Wi-Fi chip using the band-pass filter, and wherein the second single-pole multi-throw switch connects, under control of a connection control signal transmitted by the Wi-Fi chip, the movable end of the second single-pole multi-throw switch and the first or second non-movable end of the second single-pole multi-throw switch.

3. The circuit according to claim 2, wherein that the first non-movable end of the second single-pole multi-throw switch is connected to the first non-movable end of the first single-pole multi-throw switch comprises that the first non-movable end of the second single-pole multi-throw switch is connected to a movable end of a third single-pole multi-throw switch and that a first non-movable end of the third single-pole multi-throw switch is connected to the first non-movable end of the first single-pole multi-throw switch, and wherein that the output end of the power attenuator is connected to the first non-movable end of the second single-pole multi-throw switch comprises that the output end of the power attenuator is connected to a second non-movable end of the third single-pole multi-throw switch and that the movable end of the third single-pole multi-throw switch is connected to the first non-movable end of the second single-pole multi-throw switch, and wherein the third single-pole multi-throw switch connects, under control of a connection control signal transmitted by the Wi-Fi chip, the movable end of the third single-pole multi-throw switch and the first or second non-movable end of the third single-pole multi-throw switch.

4. The circuit according to claim 3, wherein the second single-pole multi-throw switch is a single-pole triple-throw switch.

5. The circuit according to claim 1, wherein the first single-pole multi-throw switch and the power attenuator are comprised in a two-level adjustable attenuator.

6. A method for avoiding channel interference, comprising:
   determining, by an access hotspot access point (AP), whether a Wireless Fidelity (Wi-Fi) signal transmitted by a signal transmit pin of a Wi-Fi chip disposed in a mobile wireless local area network (Mobile Wi-Fi) terminal generates interference to a signal of a communications standard different from a Wi-Fi communications standard; and
   transmitting, by the AP, the Wi-Fi signal using the signal transmit pin, when it is determined that the Wi-Fi signal transmitted by the signal transmit pin of the Wi-Fi chip disposed in the Mobile Wi-Fi terminal generates interference to the signal of the communications standard different from the Wi-Fi communications standard, after a movable end of a first single-pole multi-throw switch that is connected to the signal transmit pin is controlled to connect to a second non-movable end of the first single-pole multi-throw switch,
   wherein the movable end of the first single-pole multi-throw switch is connected to the signal transmit pin, wherein the first single-pole multi-throw switch comprises at least two non-movable ends, wherein a first non-movable end of the at least two non-movable ends is connected to a first signal transmit tributary, wherein the second non-movable end of the at least two non-movable ends is connected to a second signal transmit tributary, wherein the second signal transmit tributary comprises a power attenuator, and wherein an input end of the power attenuator is connected to the second non-movable end of the first single-pole multi-throw switch.

7. A method for avoiding channel interference, comprising:
   determining, by a mobile wireless local area network (Mobile Wireless Fidelity (Wi-Fi)) terminal in which a Wi-Fi chip is disposed, whether a first Wi-Fi signal transmitted using a signal transmit pin of the Wi-Fi chip generates interference to a signal of a communications standard different from a Wi-Fi communications standard; and
   transmitting, by the Mobile Wi-Fi terminal, the first Wi-Fi signal using the signal transmit pin when a result of the determining is that the first Wi-Fi signal transmitted using the signal transmit pin of the Wi-Fi chip generates the interference to the signal of the communications standard different from the Wi-Fi communication standard, after a movable end of a first single-pole multi-throw switch that is connected to the signal transmit pin and a second non-movable end of the first single-pole multi-throw switch are controlled to be connected,
   wherein the movable end of the first single-pole multi-throw switch is connected to the signal transmit pin, wherein the first single-pole multi-throw switch comprises at least two non-movable ends, wherein a first non-movable end of the at least two non-movable ends is connected to a first signal transmit tributary, wherein the second non-movable end of the at least two non-movable ends is connected to a second signal transmit tributary, wherein the second signal transmit tributary comprises a power attenuator, and wherein an input end of the power attenuator is connected to the second non-movable end of the first single-pole multi-throw switch.

8. The method according to claim 7, wherein after the transmitting, by the Mobile Wi-Fi terminal, the first Wi-Fi signal using the signal transmit pin, the method further comprises:
   determining, by the Mobile Wi-Fi terminal by scanning a frequency band that does not generate interference to a frequency band used by the signal of the communications standard different from the Wi-Fi communications standard and is used by a Wi-Fi signal that can be transmitted by the Wi-Fi chip, whether there is a second Wi-Fi signal that uses the frequency band that does not generate interference to the frequency band used by the signal of the communications standard different from the Wi-Fi communications standard;
   requesting, by the Mobile Wi-Fi terminal, to access a wireless access hotspot access point (AP) corresponding to the second Wi-Fi signal when a result of the determining is that there is the second Wi-Fi signal, and it is determined that a detected signal strength value of the second Wi-Fi signal is greater than a preset second signal strength threshold, after the first single-pole multi-throw switch is controlled to enable the movable end of the first single-pole multi-throw switch not to connect to the first non-movable end or the second non-movable end of the first single-pole multi-throw switch; and
   disconnecting, by the Mobile Wi-Fi terminal, the Mobile Wi-Fi terminal from another network that is on a wide area network (WAN) side and different from Wi-Fi to which the second Wi-Fi signal belongs, after the AP corresponding to the second Wi-Fi signal is successfully accessed.

9. The method according to claim 8, wherein the method further comprises transmitting, by the Mobile Wi-Fi terminal, the first Wi-Fi signal using the signal transmit pin, when an AP corresponding to the first Wi-Fi signal is not successfully accessed, after the movable end of the first single-pole multi-throw switch is controlled to connect to the second non-movable end of the first single-pole multi-throw switch.

10. The method according to claim 8, wherein the method further comprises:
 determining, by the Mobile Wi-Fi terminal by scanning a frequency band that generates interference to the frequency band used by the signal of the communications standard different from the Wi-Fi communications standard and is used by the Wi-Fi signal that can be transmitted by the Wi-Fi chip, whether there is a third Wi-Fi signal that uses the frequency band that generates interference to the frequency band used by the signal of the communications standard different from the Wi-Fi communications standard, when the result of the determining is that there is no such second Wi-Fi signal, wherein Wi-Fi to which the third Wi-Fi signal belongs is different from Wi-Fi to which the first Wi-Fi signal belongs;
 determining, by the Mobile Wi-Fi terminal, when it is determined that there is the third Wi-Fi signal, whether a signal strength value of the third Wi-Fi signal meets a preset condition, wherein the preset condition comprises a condition that enables the Mobile Wi-Fi terminal to be capable of accessing an AP corresponding to the third Wi-Fi signal, and enables a value of an extent to which the signal of the communications standard different from the Wi-Fi communications standard interferes with the third Wi-Fi signal to be not greater than a preset interference extent threshold;
 requesting, by the Mobile Wi-Fi terminal, to access the AP corresponding to the third Wi-Fi signal, when it is determined that the signal strength value of the third Wi-Fi signal meets the preset condition, after the movable end of the first single-pole multi-throw switch is controlled not to connect to the first non-movable end or the second non-movable end of the first single-pole multi-throw switch; and
 disconnecting, by the Mobile Wi-Fi terminal, the Mobile Wi-Fi terminal from another network that is on the WAN side and different from the Wi-Fi to which the third Wi-Fi signal belongs, after the AP corresponding to the third Wi-Fi signal is successfully accessed.

11. The method according to claim 10, wherein the method further comprises transmitting, by the Mobile Wi-Fi terminal, the first Wi-Fi signal using the signal transmit pin, when the Wi-Fi to which the third Wi-Fi signal belongs is not successfully accessed, after the movable end of the first single-pole multi-throw switch is controlled to connect to the second non-movable end of the first single-pole multi-throw switch.

12. The method according to claim 10, wherein determining, by the Mobile Wi-Fi terminal, whether the signal strength value of the third Wi-Fi signal meets the preset condition comprises:
 determining, by the Mobile Wi-Fi terminal, whether the signal strength value of the third Wi-Fi signal is greater than a preset third signal strength threshold, wherein the third signal strength threshold is a minimum signal strength value that enables the Mobile Wi-Fi terminal to be capable of accessing the Wi-Fi to which the third Wi-Fi signal belongs; and
 determining, by the Mobile Wi-Fi terminal, whether the signal strength value of the third Wi-Fi signal is greater than a preset fourth signal strength threshold when it is determined that the signal strength value of the third Wi-Fi signal is greater than the third signal strength threshold, wherein the fourth signal strength threshold is a minimum signal strength value, which enables the value of the extent to which the signal of the other communications standard interferes with the third Wi-Fi signal to be not greater than the preset interference extent threshold, of the third Wi-Fi signal.

13. An apparatus for avoiding channel interference, comprising:
 a computer processor configured to:
  determine whether a Wireless Fidelity (Wi-Fi) signal transmitted by a signal transmit pin of a Wi-Fi chip disposed in a mobile wireless local area network (Mobile Wi-Fi) terminal generates interference to a signal of a communications standard different from a Wi-Fi communications standard;
  control a movable end of a first single-pole multi-throw switch that is connected to the signal transmit pin to connect to a second non-movable end of the first single-pole multi-throw switch when a result of determining is that the Wi-Fi signal transmitted by the signal transmit pin of the Wi-Fi chip disposed in the Mobile Wi-Fi terminal generates interference to the signal of the communications standard different from the Wi-Fi communication standard; and
  transmit the Wi-Fi signal using the signal transmit pin, after the computer processor controls the movable end of the first single-pole multi-throw switch that is connected to the signal transmit pin to connect to the second non-movable end of the first single-pole multi-throw switch,
 wherein the movable end of the first single-pole multi-throw switch is connected to the signal transmit pin, wherein the first single-pole multi-throw switch comprises at least two non-movable ends, wherein a first non-movable end of the at least two non-movable ends is connected to a first signal transmit tributary, wherein the second non-movable end of the at least two non-movable ends is connected to a second signal transmit tributary, wherein the second signal transmit tributary comprises a power attenuator, and wherein an input end of the power attenuator is connected to the second non-movable end of the first single-pole multi-throw switch.

14. An apparatus for avoiding channel interference, wherein a Wireless-Fidelity (Wi-Fi) chip is disposed in the apparatus, and wherein the apparatus comprises:
 a computer processor configured to:
  determine whether a first Wi-Fi signal transmitted using a signal transmit pin of the Wi-Fi chip generates interference to a signal of a communications standard different from a Wi-Fi communications standard;
  control a movable end of a first single-pole multi-throw switch that is connected to the signal transmit pin to connect to a second non-movable end of the first single-pole multi-throw switch when a result of the determining is that the first Wi-Fi signal transmitted using the signal transmit pin of the Wi-Fi chip generates interference to the signal of the communication standard different from the Wi-Fi communication standard; and
  transmit the first Wi-Fi signal using the signal transmit pin, after the computer processor controls the movable end of the first single-pole multi-throw switch that is connected to the signal transmit pin to connect to the second non-movable end of the first single-pole multi-throw switch,
 wherein the first single-pole multi-throw switch comprises at least two non-movable ends, wherein a first non-movable end of the at least two non-movable ends is connected to a first signal transmit tributary, wherein the second non-movable end of the at least two non-movable ends is connected to a second signal transmit tributary, wherein the second signal transmit tributary comprises a power attenuator, and wherein an input end of the power attenuator is connected to the second non-movable end of the first single-pole multi-throw switch.

15. The apparatus according to claim 14, wherein the computer processor is further configured to:
   determine, after the transmitting pin transmits the first Wi-Fi signal using the signal transmit pin, by scanning a frequency band that does not generate interference to a frequency band used by the signal of the communications standard different from the Wi-Fi communications standard and is used by a Wi-Fi signal that can be transmitted by the Wi-Fi chip, whether there is a second Wi-Fi signal that uses the frequency band that does not generate interference to the frequency band used by the signal of the communications standard different from the Wi-Fi communications standard;
   request to access a wireless access hotspot access point (AP) corresponding to the second Wi-Fi signal when a result of the determining is that there is the second Wi-Fi signal, and it is determined that a detected signal strength value of the second Wi-Fi signal is greater than a preset second signal strength threshold, after the first single-pole multi-throw switch is controlled to enable the movable end of the first single-pole multi-throw switch not to connect to the first non-movable end or the second non-movable end of the first single-pole multi-throw switch; and
   disconnect the apparatus from another network that is on a wide area network (WAN) side and different from Wi-Fi to which the second Wi-Fi signal belongs after the apparatus successfully accesses the AP corresponding to the second Wi-Fi signal.

16. The apparatus according to claim 15, wherein the computer processor is further configured to control the movable end of the first single-pole multi-throw switch to connect to the second non-movable end of the first single-pole multi-throw switch when the apparatus does not successfully access an AP corresponding to the first Wi-Fi signal, and wherein the computer processor is further configured to transmit the first Wi-Fi signal using the signal transmit pin after the movable end of the first single-pole multi-throw switch is connected to the second non-movable end of the first single-pole multi-throw switch.

17. The apparatus according to claim 15, wherein the computer processor is further configured to determine, when the result of the determining is that there is no such second Wi-Fi signal, by scanning a frequency band that generates interference to the frequency band used by the signal of the communications standard different from the Wi-Fi communications standard and is used by a Wi-Fi signal that can be transmitted by the Wi-Fi chip, whether there is a third Wi-Fi signal in the frequency band that generates interference to the frequency band used by the signal of the communications standard different from the Wi-Fi communications standard, wherein Wi-Fi to which the third Wi-Fi signal belongs is different from Wi-Fi to which the first Wi-Fi signal belongs, and further configured to determine, when it is determined that there is the third Wi-Fi signal, whether a signal strength value of the third Wi-Fi signal meets a preset condition, wherein the preset condition comprises a condition that enables the apparatus to be capable of accessing an AP corresponding to the third Wi-Fi signal, and enables a value of an extent to which the signal of the other communications standard interferes with the third Wi-Fi signal to be not greater than a preset interference extent threshold, and wherein the computer processor is further configured to request to access the AP corresponding to the third Wi-Fi signal when it is determined that the signal strength value of the third Wi-Fi signal meets the preset condition, after the movable end of the first single-pole multi-throw switch is controlled not to connect to the first non-movable end or the second non-movable end of the first single-pole multi-throw switch, and wherein the computer processor is further configured to disconnect the apparatus from another network that is on the WAN side and different from the Wi-Fi to which the third Wi-Fi signal belongs after the apparatus successfully accesses the AP corresponding to the third Wi-Fi signal.

18. The apparatus according to claim 17, wherein the computer processor is further configured to:
   control the movable end of the first single-pole multi-throw switch to connect to the second non-movable end of the first single-pole multi-throw switch when the apparatus does not successfully access the Wi-Fi to which the third Wi-Fi signal belongs; and
   transmit the first Wi-Fi signal using the signal transmit pin after the movable end of the first single-pole multi-throw switch is connected to the second non-movable end of the first single-pole multi-throw switch.

19. The apparatus according to claim 17, wherein the computer processor is configured to determine whether the signal strength value of the third Wi-Fi signal is greater than a preset third signal strength threshold, wherein the third signal strength threshold is a minimum signal strength value that enables the apparatus to be capable of accessing the Wi-Fi to which the third Wi-Fi signal belongs, and configured to determine, when it is determined that the signal strength value of the third Wi-Fi signal is greater than the third signal strength threshold, whether the signal strength value of the third Wi-Fi signal is greater than a preset fourth signal strength threshold, wherein the fourth signal strength threshold is a minimum signal strength value, which enables the value of the extent to which the signal of the other communications standard interferes with the third Wi-Fi signal to be not greater than the preset interference extent threshold, of the third Wi-Fi signal.

\* \* \* \* \*